US012807430B2

(12) United States Patent
Kanemoto et al.

(10) Patent No.: US 12,807,430 B2
(45) Date of Patent: Nov. 24, 2026

(54) ROBOTIC SYSTEMS WITH DYNAMIC MOTION PLANNING FOR TRANSFERRING UNREGISTERED OBJECTS

(71) Applicant: MUJIN, Inc., Tokyo (JP)

(72) Inventors: Yoshiki Kanemoto, Tokyo (JP); Yuta Kojio, Tokyo (JP)

(73) Assignee: MUJIN, Inc., Tokyo (JP)

( * ) Notice: Subject to any disclaimer, the term of this patent is extended or adjusted under 35 U.S.C. 154(b) by 136 days.

(21) Appl. No.: 18/492,444

(22) Filed: Oct. 23, 2023

(65) Prior Publication Data

US 2024/0132303 A1 Apr. 25, 2024
US 2024/0228192 A9 Jul. 11, 2024

Related U.S. Application Data

(60) Provisional application No. 63/418,637, filed on Oct. 24, 2022.

(51) Int. Cl.
*B65G 47/00* (2006.01)
*B65G 47/90* (2006.01)

(52) U.S. Cl.
CPC .................................. *B65G 47/905* (2013.01)

(58) Field of Classification Search
CPC ........ B65G 47/905; G05B 2219/40519; G05B 2219/40006; G05B 2219/45063; B25J 9/1664; B25J 9/1687; B25J 13/086; B25J 9/0093

See application file for complete search history.

(56) References Cited

U.S. PATENT DOCUMENTS 10,870,204 B2 12/2020 Diankov et al.
2018/0056512 A1* 3/2018 Watts ..................... B25J 9/1664
2020/0047331 A1* 2/2020 Chitta .................. B25J 15/0683
(Continued)

FOREIGN PATENT DOCUMENTS

JP H0612112 A 1/1994
JP H07299777 A 11/1995
(Continued)

OTHER PUBLICATIONS

International Search Report and Written Opinion received in PCT Application No. PCT/JP2023/038354 dated Dec. 26, 2023, pp. all.

*Primary Examiner* — Khoi H Tran
*Assistant Examiner* — Tien Minh Le
(74) *Attorney, Agent, or Firm* — Dorsey & Whitney LLP

(57) ABSTRACT

Robotic systems with dynamic motion planning for transferring unregistered objects (and associated systems, devices, and methods) are disclosed herein. In one embodiment, a method for operating a robotic system includes (i) receiving sensor data representing a distance between a sensor of the robotic system and a target object engaged by an end-effector of the robotic system, and (ii) determining a height of the target object based at least in part on the sensor data. The method can further comprise updating, based at least in part on the height of the target object, a motion plan for placing the target object at a destination location. The updated motion plan can include commands, settings, or a combination thereof for operating a robotic arm and the end-effector to (i) approach the destination location and (ii) disengage the target object for placing the target object at the destination location.

20 Claims, 9 Drawing Sheets

(56) References Cited

U.S. PATENT DOCUMENTS

| | | | | |
|---|---|---|---|---|
| 2020/0130963 | A1* | 4/2020 | Diankov | G06T 19/20 |
| 2021/0053216 | A1* | 2/2021 | Diankov | B25J 9/1669 |
| 2021/0269262 | A1 | 9/2021 | Mori et al. | |
| 2022/0135347 | A1* | 5/2022 | Cohen | B65G 47/917<br>700/245 |
| 2023/0142013 | A1 | 5/2023 | Ushiyama et al. | |

FOREIGN PATENT DOCUMENTS

| | | | |
|---|---|---|---|
| JP | 2019051559 | A | 4/2019 |
| JP | 2021160041 | A | 10/2021 |
| JP | 2021534002 | A | 12/2021 |
| JP | 2023072410 | A | 5/2023 |
| KR | 20210138359 | A | 11/2021 |
| WO | 2008111452 | A1 | 9/2008 |
| WO | 2019240273 | A1 | 12/2019 |

* cited by examiner

ROBOTIC SYSTEMS WITH DYNAMIC MOTION PLANNING FOR TRANSFERRING UNREGISTERED OBJECTS

CROSS-REFERENCE TO RELATED APPLICATION(S)

The present application claims the benefit of U.S. Provisional Patent Application Ser. No. 63/418,637, filed Oct. 24, 2022, which is incorporated herein by reference in its entirety.

TECHNICAL FIELD

The present technology is generally directed to robotic systems and, more specifically, to systems, processes, and techniques for object detection. For example, several embodiments of the present technology are directed to robotic systems with dynamic motion planning for transferring unregistered objects (e.g., having initially unknown dimensions), such as robotic systems with dynamic approach, depart, and/or return path motion planning based on sensor data obtained using upward facing sensors.

BACKGROUND

With their ever-increasing performance and lowering cost, many robots (e.g., machines configured to automatically/autonomously execute physical actions) are now extensively used in many fields. Robots, for example, can be used to execute various tasks (e.g., manipulate or transfer an object through space) in manufacturing and/or assembly, packing and/or packaging, transport and/or shipping, etc. In executing the tasks, the robots can replicate human actions, thereby replacing or reducing the human involvement that would otherwise be required to perform dangerous or repetitive tasks.

Despite the technological advancements, however, robots often lack the sophistication necessary to duplicate human interactions required for executing larger and/or more complex tasks. Accordingly, there remains a need for improved techniques and systems for managing operations and/or interactions between robots.

DETAILED DESCRIPTION

Figure 1:
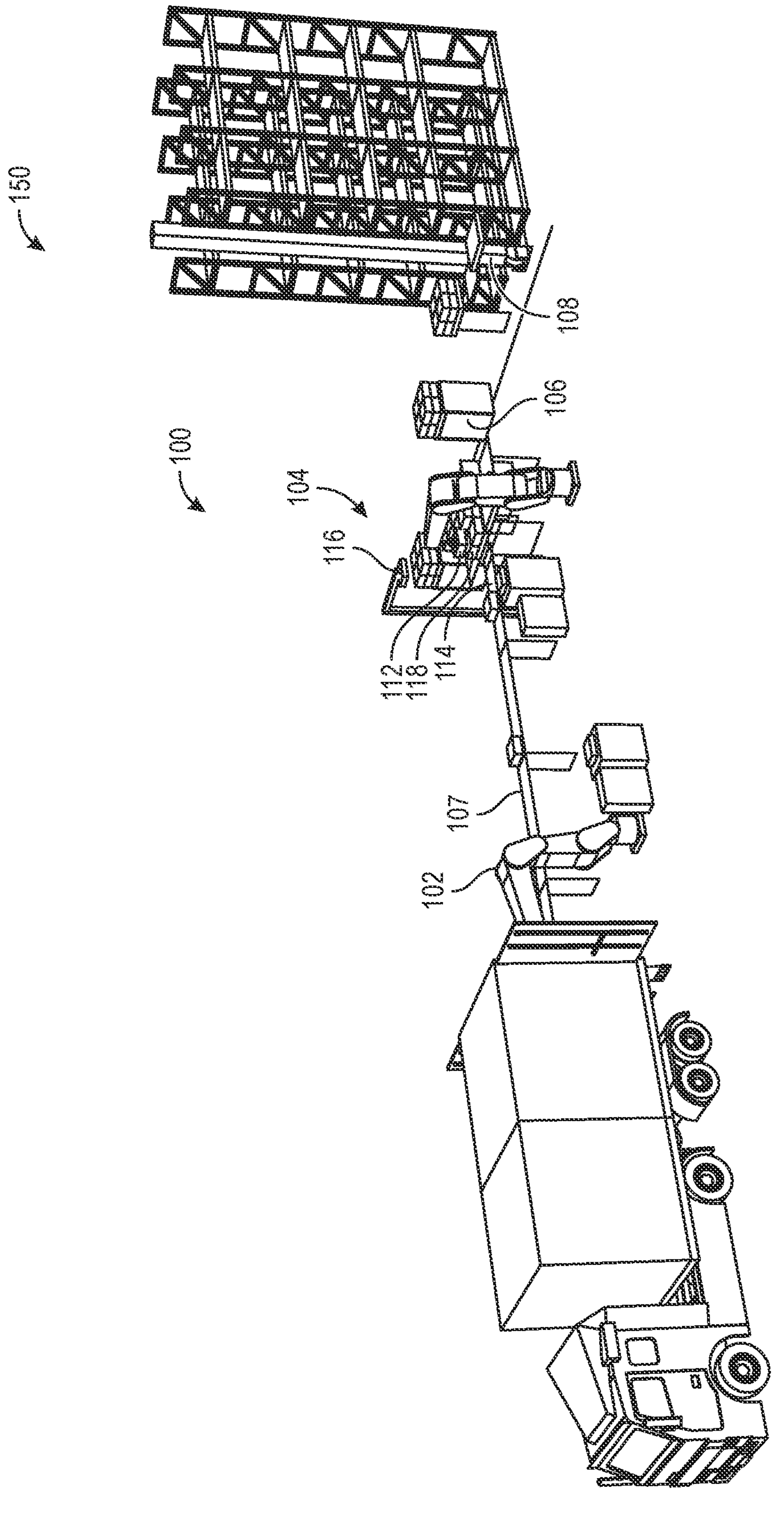
FIG. 1 is a partially schematic perspective view of an example environment in which a robotic system with a coordinated transfer mechanism may operate in accordance with various embodiments of the present technology.

Robotic systems with dynamic motion planning for transferring unregistered objects (and associated systems, devices, and methods) are disclosed herein. Unregistered objects can include objects having one or more properties or characteristics that are not included, stored, or registered in master data of a robotic system employed to transfer the unregistered objects between a source location and a destination location. Additionally, or alternatively, unregistered objects can include objects having one or more properties or characteristics that may be erroneously detected, occluded, altered, and/or otherwise determined to be different from the features included in the master data. As a result, the unregistered objects can be (at least initially) 'unknown' to the robotic system. The unknown properties or characteristics of the unregistered objects can include physical dimensions (e.g., length and/or width of one or more sides of the objects), shape, center of mass location, weight, SKU, fragility rating, etc. A specific example of a property of an unregistered target object that may be unknown to a robotic system is height of the target object.

Without knowledge of a target object's property, it may be difficult for a robotic system to place the target object at a destination location. For example, although it may be possible to (i) engage a top surface of the target object at a source location using an end-effector of the robotic system and (ii) transfer the target object toward the destination location (e.g., based on a maximum possible height value and/or a minimum possible height value for the target object), the robotic system may not be aware of a location of a bottom surface of the target object. Thus, the robotic system may not be able to determine how far it must lower the target object toward the destination location before disengaging (e.g., dropping) the target object at the destination location. Releasing at a higher location for a shorter object may increase the dropped distance and increase the risk of damaging the object and the contents therein. Alternatively, excessively lowering the grasped object can crush the grasped object and the contents therein.

To address this concern, robotic systems of the present technology can include sensors (e.g., distance sensors) having vertically oriented fields of view. While transferring an unregistered target object between a source location and a destination location, a robotic system of the present technology can present the target object to a vertically oriented sensor by positioning the target object within the vertically oriented field of view of the sensor. In turn, the sensor can be used to determine a distance (e.g., a second distance) between the target object and the sensor. In addition, given that (i) the location of the sensor and (ii) the location of the end-effector gripping the target object are known to the robotic system, the robotic system can determine a distance (e.g., a first distance) between the end-effector and the sensor at the time the target object is presented to the sensor. Thus, the robotic system can determine a height of the target object by determining a difference between the first distance and the second distance.

Knowledge of the height of the target object and the location of the end-effector enables the robotic system to determine a location of a bottom surface of the target object. In turn, the robotic system can determine an approach path for a robotic arm and the end-effector of the robotic system to place the target object at the destination location. In some embodiments, the robotic system can optimize the approach path and/or a speed at which the robotic arm and the end-effector move along the approach path, such as to reduce or minimize time spent by the robotic system placing the target object at the destination location.

In addition, in some embodiments, the robotic system can determine a height (e.g., a release height) above the destination location at which the end-effector of the robotic system can safely disengage (e.g., drop) the target object for placing the target object at the destination location. The release height can depend on one or more properties of the target object. For example, the robotic system can determine a lower release height for a heavier or more fragile target object, and/or can determine a higher release height for a lighter or less fragile target object.

Furthermore, knowledge of the height of a target object enables the robotic system to determine a future location of the end-effector that corresponds to the time when the bottom surface of the target object is positioned at the release height for the target object. Therefore, the robotic system can dynamically calculate a return path for returning the end-effector to a start location directly from the future location of the end-effector. Thus, time spent by the robotic system returning the end-effector to the start location can be less than time spent by a robotic system that first raises the end-effector to a precalculated/predetermined height (e.g., to avoid horizontal line sensors or other components of the robotic system) following placement of the target object at the destination location before moving the end-effector to the start location along a return path.

In the following description, numerous specific details are set forth to provide a thorough understanding of the presently disclosed technology. In other embodiments, the techniques introduced herein can be practiced without these specific details. In other instances, well-known features, such as specific functions or routines, are not described in detail herein in order to avoid unnecessarily obscuring the present disclosure. References in this description to "an embodiment," "one embodiment," or the like mean that a particular feature, structure, material, or characteristic being described is included in at least one embodiment of the present disclosure. Thus, the appearances of such phrases in this specification do not necessarily all refer to the same embodiment. On the other hand, such references are not necessarily mutually exclusive either. Furthermore, the particular features, structures, materials, or characteristics can be combined in any suitable manner in one or more embodiments. It is to be understood that the various embodiments shown in the figures are merely illustrative representations and are not necessarily drawn to scale.

Several details describing structures or processes that are well-known and often associated with robotic systems and subsystems, but that can unnecessarily obscure some significant aspects of the disclosed techniques, are not set forth in the following description for purposes of clarity. Moreover, although the following disclosure sets forth several embodiments of different aspects of the present technology, several other embodiments can have different configurations or different components than those described in this section. Accordingly, the disclosed techniques can have other embodiments with additional elements or without several of the elements described below.

Many embodiments or aspects of the present disclosure described below can take the form of computer- or controller-executable instructions, including routines executed by a programmable computer or controller. Those skilled in the relevant art will appreciate that the disclosed techniques can be practiced on computer or controller systems other than those shown and described below. The techniques described herein can be embodied in a special-purpose computer or data processor that is specifically programmed, configured, or constructed to execute one or more of the computer-executable instructions described below. Accordingly, the terms "computer" and "controller" as generally used herein refer to any data processor and can include Internet appliances and handheld devices (including palm-top computers, wearable computers, cellular or mobile phones, multi-processor systems, processor-based or programmable consumer electronics, network computers, mini computers, and the like). Information handled by these computers and controllers can be presented at any suitable display medium, including a liquid crystal display (LCD). Instructions for executing computer- or controller-executable tasks can be stored in or on any suitable computer-readable medium, including hardware, firmware, or a combination of hardware and firmware. Instructions can be contained in any suitable memory device, including, for example, a flash drive, USB device, and/or other suitable medium.

The terms "coupled" and "connected," along with their derivatives, can be used herein to describe structural relationships between components. It should be understood that these terms are not intended as synonyms for each other. Rather, in particular embodiments, "connected" can be used to indicate that two or more elements are in direct contact with each other. Unless otherwise made apparent in the context, the term "coupled" can be used to indicate that two or more elements are in either direct or indirect (with other intervening elements between them) contact with each other, or that the two or more elements co-operate or interact with each other (e.g., as in a cause-and-effect relationship, such as for signal transmission/reception or for function calls), or both.

Suitable Environments

FIG. 1 is a partially schematic perspective view of an example environment 150 in which a robotic system 100 with a coordinated transfer mechanism may operate in accordance with various embodiments of the present technology. The robotic system 100 can include and/or communicate with one or more units (e.g., robots) configured to execute one or more tasks. Aspects of the coordinated transfer mechanism can be practiced or implemented by the various units.

In the illustrated embodiment, the robotic system 100 can include an unloading unit 102, a transfer unit 104 (e.g., a palletizing robot and/or a piece-picker robot), a transport unit 106, a loading unit 108, or a combination thereof in a warehouse or a distribution/shipping hub. Each of the units in the robotic system 100 can be configured to execute one or more tasks. The tasks can be combined in sequence to perform an operation that achieves a goal, such as to unload objects from a truck or a van and store them in a warehouse or to unload objects from storage locations and prepare them for shipping. In some embodiments, the task can include placing the objects on a target location (e.g., on top of a pallet and/or inside a bin/cage/box/case). As described in detail below, the robotic system 100 can derive individual placement locations/orientations, calculate corresponding motion plans, or a combination thereof for placing and/or stacking the objects. Each of the units can be configured to execute a sequence of actions (e.g., operating one or more components therein) to execute a task.

In some embodiments, the task can include manipulation (e.g., moving and/or reorienting) of a target object 112 (e.g., one of the packages, boxes, cases, cages, pallets, etc. corresponding to the executing task) from a start/source location 114 to a task/destination location 118. For example, the unloading unit 102 (e.g., a devanning robot) can be configured to transfer the target object 112 from a location in a carrier (e.g., a truck) to a location on a conveyor 107. Also, the transfer unit 104 can be configured to transfer the target object 112 between one location (e.g., the conveyor 107, a pallet, or a bin) and another location (e.g., a pallet, a bin, another conveyor, etc.). For example, the transfer unit 104 (e.g., a palletizing robot) can be configured to transfer the target object 112 from a source location (e.g., a pallet, a bin, a pickup area, and/or a conveyor at which the transfer unit 104 engages the target object 112) to a destination location (e.g., a pallet, a bin, a dropoff area, and/or a conveyor at which the transfer unit 104 places or disengages the target object 112). The transport unit 106 (e.g., a conveyor, an automated guided vehicle (AGV), a shelf-transport robot, etc.) can transfer the target object 112 between (a) an area associated with the transfer unit 104 and (b) an area associated with the loading unit 108. The loading unit 108 can transfer the target object 112 (by, e.g., moving the pallet carrying the target object 112) between the transfer unit 104 and a storage location (e.g., a location on the shelves).

In some embodiments, the robotic system 100 can include sensors 116, such as two-dimensional imaging sensors and three-dimensional imaging sensors. For example, the robotic system 100 can include sensors 116 placed above a source location, such as one or more top down facing sensors 6. The sensors 116 placed above the source location can be used to, for example, recognize objects 112 (e.g., unknown objects, unregistered objects, known objects, and/or registered objects) at the source location, and/or calculate dimensions (e.g., a length and/or a width of top surfaces of) the objects 112. In some embodiments, the robotic system 100 can process sensor information of a top surface of a target object 112 that is captured using the sensors 116 to calculate detection results that may or may not correspond with registered objects (e.g., objects having corresponding information included in master data).

For illustrative purposes, the robotic system 100 is described in the context of a packaging and/or shipping center. It is understood, however, that the robotic system 100 can be configured to execute tasks in other environments/for other purposes, such as for manufacturing, assembly, storage/stocking, healthcare, and/or other types of automation. It is also understood that the robotic system 100 can include other units, such as manipulators, service robots, modular robots, etc., not shown in FIG. 1. For example, in some embodiments, the robotic system 100 can include a loading unit (e.g., the unloading unit 102), a depalletizing unit (e.g., the transfer unit 104) for transferring the objects from cage carts or pallets onto conveyors (e.g., the conveyor 107 or another conveyor) or other pallets, a container-switching unit for transferring the objects from one container to another, a packaging unit for wrapping/casing the objects, a sorting unit for grouping objects according to one or more characteristics thereof, a piece-picking unit (e.g., the unloading unit 102, the transfer unit 104, or another unit) for manipulating (e.g., for sorting, grouping, and/or transferring) the objects differently according to one or more characteristics thereof, or a combination thereof.

Suitable System

Figure 2:
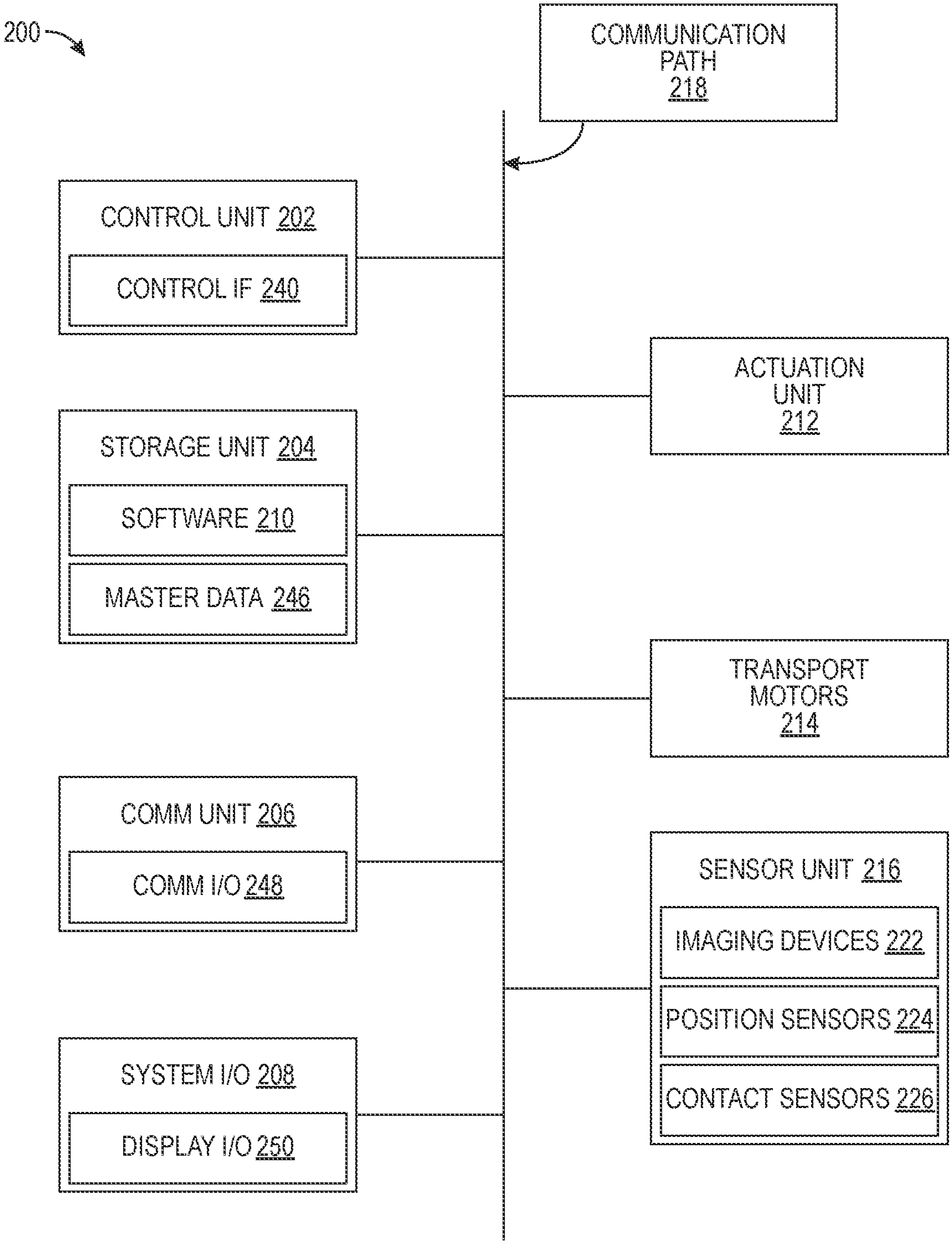
FIG. 2 is a partially schematic block diagram of a robotic system configured in accordance with various embodiments of the present technology.

FIG. 2 is a partially schematic block diagram of a robotic system 200 (e.g., the robotic system 100 of FIG. 1 or another robotic system) configured in accordance with various embodiments of the present technology. In some embodiments, the robotic system 200 (e.g., at one or more units and/or robots described above) can include electronic/electrical devices, such as one or more processors 202, one or more storage devices 204, one or more communication devices 206, one or more input-output devices 208, one or more actuation devices 212, one or more transport motors 214, one or more sensors 216, or a combination thereof. The various devices can be coupled to each other via wire connections and/or wireless connections. For example, the robotic system 200 can include a communication path 218 (e.g., a bus), such as a system bus, a Peripheral Component Interconnect (PCI) bus or PCI-Express bus, a HyperTransport or industry standard architecture (ISA) bus, a small computer system interface (SCSI) bus, a universal serial bus (USB), an IIC (I2C) bus, or an Institute of Electrical and Electronics Engineers (IEEE) standard 1394 bus (also referred to as "Firewire"). Also, for example, the robotic system 200 can include bridges, adapters, processors, or other signal-related devices for providing the wire connections between the devices. The wireless connections can be based on, for example, cellular communication protocols (e.g., 3G, 4G, LTE, 5G, etc.), wireless local area network (LAN) protocols (e.g., wireless fidelity (Wi-Fi)), peer-to-peer or device-to-device communication protocols (e.g., Bluetooth, Near-Field communication (NFC), etc.), Internet of Things (IoT) protocols (e.g., NB-IoT, LTE-M, etc.), and/or other wireless communication protocols.

The processors 202 can include data processors (e.g., central processing units (CPUs), special-purpose computers, and/or onboard servers) configured to execute instructions (e.g., software instructions) stored on the storage devices 204 (e.g., computer memory). In some embodiments, the processors 202 can be included in a separate/stand-alone controller that is operably coupled to the other electronic/electrical devices illustrated in FIG. 2 and/or the robotic units illustrated in FIG. 1. The processors 202 can implement the program instructions to control/interface with other devices, thereby causing the robotic system 200 to execute actions, tasks, and/or operations.

The storage devices 204 can include non-transitory computer-readable mediums having stored thereon program instructions (e.g., software 210). Some examples of the storage devices 204 can include volatile memory (e.g., cache and/or random-access memory (RAM)) and/or non-volatile memory (e.g., flash memory and/or magnetic disk drives). Other examples of the storage devices 204 can include portable memory and/or cloud storage devices.

In some embodiments, the storage devices 204 can be used to further store and provide access to processing results and/or predetermined data/thresholds. For example, the storage devices 204 can store master data 246 that includes descriptions of objects (e.g., boxes, cases, and/or products) that may be manipulated by the robotic system 200. In one or more embodiments, the master data 246 can include a dimension, a shape (e.g., templates for potential poses and/or computer-generated models for recognizing the object in different poses), a color scheme, an image, identification information (e.g., bar codes, quick response (QR) codes, logos, etc., and/or expected locations thereof), an expected weight, other physical/visual characteristics, or a combination thereof for the objects expected to be manipulated by the robotic system 200. In some embodiments, the master data 246 can include manipulation-related information regarding the objects, such as a center-of-mass (CoM) location on each of the objects, expected sensor measurements (e.g., for force, torque, pressure, and/or contact measurements) corresponding to one or more actions/maneuvers, or a combination thereof.

The communication devices 206 can include circuits configured to communicate with external or remote devices via a network. For example, the communication devices 206 can include communication input/output devices 248, such as receivers, transmitters, transceivers, modulators/demodulators (modems), signal detectors, signal encoders/decoders, connector ports, network cards, etc. The communication devices 206 can be configured to send, receive, and/or process electrical signals according to one or more communication protocols (e.g., the Internet Protocol (IP), wireless communication protocols, etc.). In some embodiments, the robotic system 200 can use the communication devices 206 to exchange information between units of the robotic system 200 and/or exchange information (e.g., for reporting, data gathering, analyzing, and/or troubleshooting purposes) with systems or devices external to the robotic system 200.

The input-output devices 208 can include user interface devices configured to communicate information to and/or receive information from human operators. For example, the input-output devices 208 can include a display 250 and/or other output devices (e.g., a speaker, a haptics circuit, or a tactile feedback device, etc.) for communicating information to the human operator. Also, the input-output devices 208 can include control or receiving devices, such as a keyboard, a mouse, a touchscreen, a microphone, a user interface (UI) sensor (e.g., a camera for receiving motion commands), a wearable input device, etc. In some embodiments, the robotic system 200 can use the input-output devices 208 to interact with the human operators in executing an action, a task, an operation, or a combination thereof.

The robotic system 200 can include physical or structural members (e.g., robotic manipulator arms) that are connected at joints for motion (e.g., rotational and/or translational displacements). The structural members and the joints can form a kinetic chain configured to manipulate an end-effector (e.g., a gripper) configured to execute one or more tasks (e.g., gripping, spinning, welding, etc.) depending on the use/operation of the robotic system 200. The actuation devices 212 (e.g., motors, actuators, wires, artificial muscles, electroactive polymers, etc.) can be configured to drive or manipulate (e.g., displace and/or reorient) the structural members about or at a corresponding joint. In some embodiments, the transport motors 214 can be configured to transport the corresponding units/chassis from place to place.

The sensors 216 can be configured to obtain information used to implement various tasks, such as manipulating the structural members and/or transporting objects. The sensors 216 can include devices configured to detect or measure one or more physical properties of the robotic system 200 (e.g., a state, a condition, and/or a location of one or more structural members/joints thereof), of one or more objects (e.g., individual objects 112 of FIG. 1), and/or of a surrounding environment. Some examples of the sensors 216 can include accelerometers, gyroscopes, force sensors, weight sensors or transducers, distance sensors, image sensors, strain gauges, tactile sensors, torque sensors, position encoders, etc.

In some embodiments, for example, the sensors 216 can include one or more imaging devices 222 (e.g., visual and/or infrared cameras, 2D and/or 3D imaging cameras, distance measuring devices such as lidars or radars, etc.) configured to detect the surrounding environment. The imaging devices 222 can generate representations of the detected environment, such as digital images and/or point clouds, that may be processed via machine/computer vision (e.g., for automatic inspection, robot guidance, or other robotic applications). The robotic system 200 (via, e.g., the processors 202) can process the digital image and/or a point cloud to identify a target object, one or more dimensions (e.g., length, width, and/or height dimensions) of the target object, a pickup/start/source location, a drop/end/destination/task location, a pose of the target object, a confidence measure regarding the start location and/or the pose, or a combination thereof.

For manipulating the target object, the robotic system 200 (via, e.g., the various circuits/devices described above) can capture and analyze image data of a designated area (e.g., a pickup location, such as inside a truck, on a pallet, or on a conveyor belt) to identify the target object and a start location thereof. Similarly, the robotic system 200 can capture and analyze image data of another designated area (e.g., a drop location for placing objects on a conveyor, a location for placing objects inside a container, or a location on a pallet for stacking purposes) to identify a task location for the target object. For example, the imaging devices 222 can include one or more cameras configured to generate image data of the pickup area and/or one or more cameras configured to generate image data of the task area (e.g., drop area). Based on the image data, as described below, the robotic system 200 can determine the start location, the task location, the associated poses, a packing/placement location, and/or other processing results.

In some embodiments, the sensors 216 can include contact sensors 226 (e.g., pressure sensors, force sensors, strain gauges, piezoresistive/piezoelectric sensors, capacitive sensors, elastoresistive sensors, and/or other tractile sensors) configured to measure one or more characteristics associated with a direct contact between multiple physical structures or surfaces. The contact sensors 226 can measure characteristics that correspond to a grip of an end-effector (e.g., a gripper) on a target object. Accordingly, the contact sensors 226 can output a contact measure that represents a quantified measure (e.g., a measured force, torque, position, etc.) corresponding to a degree of contact or attachment between the gripper and the target object. For example, the contact measure can include one or more force or torque readings associated with forces applied to the target object by the end-effector.

In these and other embodiments, the sensors 216 can include position sensors 224 (e.g., position encoders, potentiometers, distance sensors, etc.) configured to detect positions of structural members (e.g., robotic arms and/or corresponding end-effectors of the robotic system 200), corresponding joints of the robotic system 200, and/or other objects (e.g., the individual objects 112 of FIG. 1, a target object, other obstacles, etc.). The robotic system 200 can use the position sensors 224 to track locations and/or orientations of the structural members, the joints, and/or the other objects during execution of various tasks. In these and still other embodiments, the sensors 216 can include weight sensors (e.g., weight transducers), such as for determining a weight of a target object gripped by an end-effector of the robotic system 200.

System Operation

Figure 3:
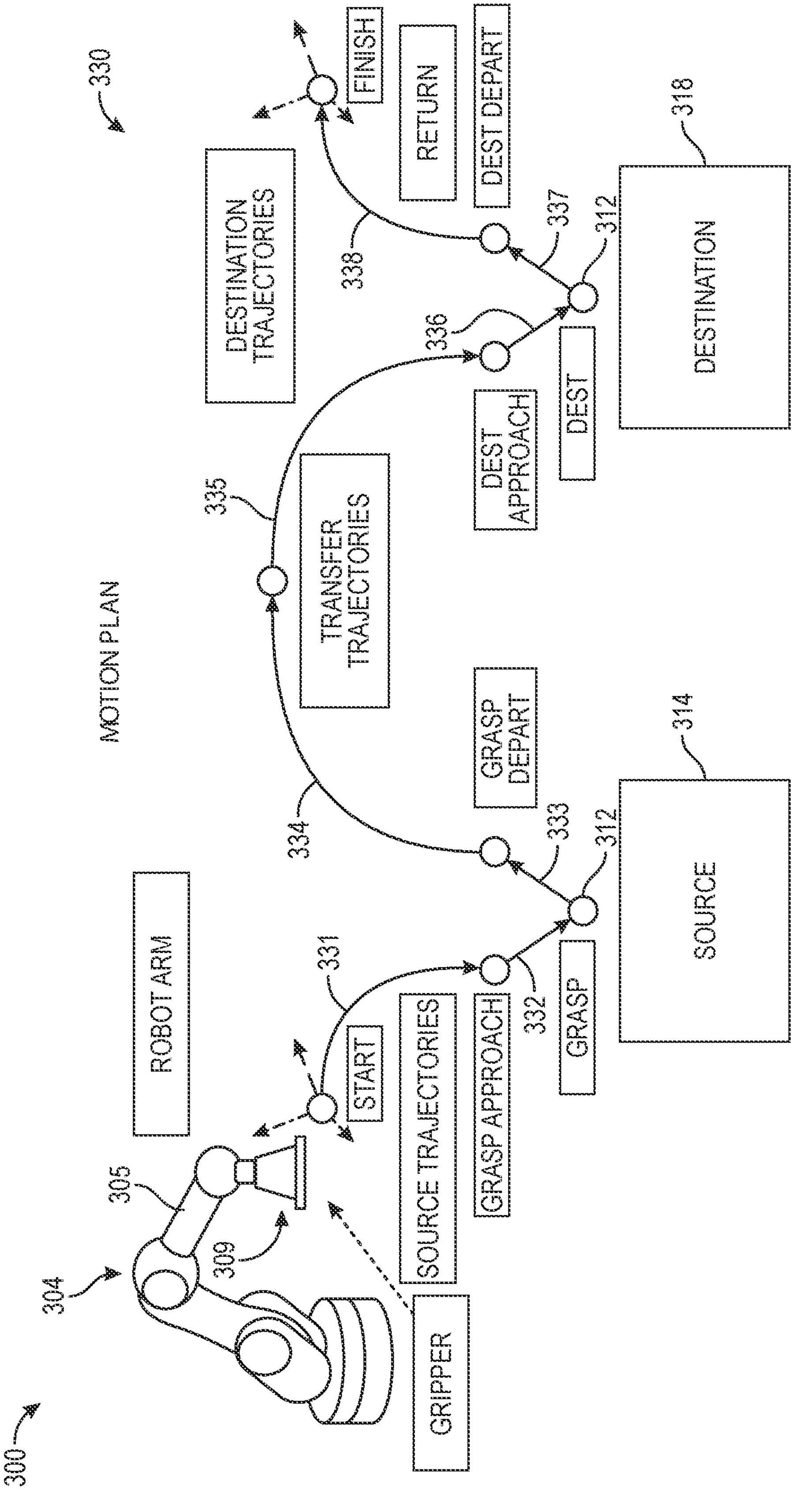
FIG. 3 is a partially schematic diagram of a motion plan for a robotic system configured in accordance with various embodiments of the present technology.

FIG. 3 is a partially schematic diagram of a motion plan 330 for a robotic system 300 (e.g., the robotic system 100 of FIG. 1, the robotic system 200 of FIG. 2, or another robotic system) configured in accordance with various embodiments of the present technology. The motion plan 330 can represent a sequence of actions or movements executed by the robotic system 300 (e.g., by one of the units described above, such as a robotic arm 305 and/or an end-effector 309 of a transfer unit 304) to achieve a goal or complete a task. As illustrated in FIG. 3, for example, the motion plan 330 can be generated and/or implemented to move a target object 312 from a source location 314 (e.g., a location on or in a conveyor, pallet, bin, etc.) to a task or destination location 318 (e.g., another location on or in a conveyor, pallet, bin, etc.).

In some embodiments, the robotic system 300 can generate detection results corresponding to objects at the source location 314. For example, the robotic system 300 can image or monitor a predetermined area to identify and/or locate the source location 314. As a specific example, the robotic system 300 can include a source sensor (e.g., an instance of the sensors 116 of FIG. 1 and/or the sensors 216 of FIG. 2) directed at a pickup area, such as an area designated for a sourcing pallet, sourcing bin, and/or a sourcing region on a receiving side of a conveyor. The robotic system 300 can use the source sensor to generate image data (e.g., a captured image and/or a point cloud) and/or other sensor data of the pickup area. The robotic system 300 can implement computer vision and/or other processes for the image and/or other sensor data to identify different objects (e.g., boxes or cases) located at the pickup area and/or to determine one or more dimensions (e.g., a length, a width, etc. associated with, for example, top surfaces) of the objects. From the recognized objects, the robotic system 300 can select (e.g., according to a predetermined sequence or set of rules and/or templates of object outlines) an object as the target object 312. For the selected target object 312, the robotic system 300 can further process the image and/or other sensor data to determine the source location 314 and/or an initial pose of the target object 312.

The robotic system 300 can further image or monitor another predetermined area to identify the destination location 318. In some embodiments, for example, the robotic system 300 can include a destination sensor (e.g., another instance of the sensors 116 of FIG. 1 and/or of the sensors 216 of FIG. 2) configured to generate image data and/or other sensor data of a placement area, such as an area designated for a destination pallet, destination bin, and/or a destination region on a sending side of a conveyor. The robotic system 300 can use the destination sensor to generate image data (e.g., a captured image and/or a point cloud) and/or other sensor data of the placement area. The robotic system 300 can implement computer vision and/or other processes for the image and/or other sensor data to identify the destination location 318 and/or a corresponding pose for placing the target object 312. In some embodiments, the robotic system 300 can identify (based on or not based on the image and/or other sensor data) the destination location 318 according to a predetermined sequence or set of rules for stacking, arranging, and/or placing one or more objects.

Using the identified source location 314 and/or the identified destination location 318, the robotic system 300 can operate one or more structures (e.g., the robotic arm 305 and/or the end-effector 309) of a corresponding unit (e.g., the transfer unit 304) to execute the task of transferring the selected target object 312 from the source location 314 to the destination location 318. More specifically, the robotic system 300 can derive or calculate (via, e.g., motion planning rules or algorithms) the motion plan 330 that corresponds to one or more actions that will be implemented by the corresponding unit to execute the task. In general, the motion plan 330 can include source trajectories associated with grasping a target object 312 at the source location 314, transfer trajectories associated with transferring the target object 312 from the source location 314 to the destination location 318, destination trajectories associated with releasing the target object 312 at the destination location 318, and/or return trajectories associated with a subsequent motion plan and/or with returning the corresponding unit to a start location.

In the specific example shown in FIG. 3, the motion plan 330 for the transfer unit 304 includes a source approach path 331 specifying one or more trajectories for the robotic arm 305 and/or the end-effector 309 of the transfer unit 304 for positioning the end-effector 309 at a source approach location; a grasp approach path 332 specifying one or more trajectories and/or operations for the robotic arm 305 and/or the end-effector 309 for positioning and/or operating the end-effector 309 for gripping or otherwise engaging the target object 312 at the source location 314; and/or a grasp depart path 333 specifying one or more trajectories for the robotic arm 305 and/or the end-effector 309 for moving the target object 312 away from the source location 314. The motion plan further includes transfer paths 334 and 335 specifying one or more trajectories for moving the robotic arm 305 and/or the end-effector 307 for transferring the target object 312 toward the destination location 318. Additionally, the motion plan 330 includes a destination approach path 336 specifying one or more trajectories and/or operations for the robotic arm 305 and/or the end-effector 309 of the transfer unit 304 for positioning and/or operating the end-effector 309 for placing or otherwise disengaging/releasing the target object 312 at the destination location 318; a destination depart path 337 specifying one or more trajectories for the robotic arm 305 and/or the end-effector 309 for positioning the end-effector 309 of the transfer unit 304 at a depart location; and/or a return path 338 specifying one or more trajectories for the robotic arm 305 and/or the end-effector 309 for positioning the end-effector 309 of the transfer unit 304 at a start location (e.g., in preparation for execution of or as part of executing a next task involving transferring another object from the source location 314 to the destination location 318).

In some embodiments, the start location can be a default location for the end-effector 309. For example, the start location can be a location to which the end-effector 309 is returned by default after placing the target object 312 at the destination location 318. As another example, the start location can be a storage or idle location at which the end-effector 309 is positioned off to the side/out of the way, and/or a location at which the transfer unit 304 positions the end-effector 309 while the robotic system 300 derives or awaits further commands (e.g., for transferring a next target object between a source location and a destination location).

In these and other embodiments, the start location can be a location at which the transfer unit 304 positions the end-effector 309 to implement (or as part of implementing) a next source approach path and/or a next grasp approach path of a next motion plan derived for transferring a next target object between a source location and a destination location. For example, the start location can be a beginning location of a next source approach path and/or a next grasp approach path that may be implemented by the robotic system 300 to transfer a next target object between a source location and a destination location in accordance with a next motion plan. In other words, the return path 338 can be linked to a start of one or more paths of the next motion plan. Thus, after placing the target object 312 at the destination location 318, the robotic system 300 can implement the return path 338 in the motion plan 330 such that the robotic system 300 can implement the next source approach path and/or the next grasp approach path of the next motion plan for transferring the next target object. As another example, the next source approach path and/or the next grasp approach path of the next motion plan for the next target object can include at least part of the return path of the motion plan 330 for the target object 312. Thus, when the robotic system 300 implements the return path 338 of the motion plan 330, the robotic system 300 can also be implementing at least part of the next source approach path and/or the next grasp approach path of the next motion plan for the next target object. In either of these examples, the start location specified in the return path 338 can depend at least in part on the next target object (e.g., a position, pose, property of the next target object) and/or the next motion plan. Additionally, or alternatively, the next motion plan can depend at least in part on the return path 338.

In some embodiments, the robotic system 300 can derive or calculate the motion plan 330 by determining a sequence of commands and/or settings for one or more actuation devices (e.g., the actuation devices 212 of FIG. 2) that operate the robotic arm 305 and/or the end-effector 309. For example, the robotic system 300 can use processors to calculate the commands and/or settings of the actuation devices for manipulating the end-effector 309 and/or the robotic arm 305 to place the end-effector 309 (e.g., a gripper) at the approach location about the source location 314, engage and grab the target object 312 with the end-effector 309, place the end-effector 309 at a particular location about the destination location 318, release the target object 312 from the end-effector 309 at or near the destination location 318, and/or return the end-effector 309 to a start location. All or a subset of the sequence of commands and/or settings can be pre-derived or precalculated (e.g., before the robotic system 300 implements all or a subset of the motion plan 330). In these and other embodiments, all or a subset of the sequence of commands and/or settings can be dynamically derived and/or calculated (e.g., in real time, and/or as the robotic system 300 implements all or a subset of the motion plan 330). In these and still other embodiments, all or a subset of the sequence of commands and/or settings can be rederived or recalculated (e.g., in light of new information determined or made available to the robotic system 300, such as an actual height of an unregistered object as discussed in greater detail below). The robotic system 300 can execute the actions for completing the task by operating the actuation devices according to the determined sequence of commands and/or settings.

In executing the actions associated with the motion plan 330, the robotic system 300 can track a current location (e.g., a set of coordinates corresponding to a grid used by the robotic system 300) and/or a current pose of the target object 312. For example, the robotic system 300 (via, e.g., one or more processors, such as processors 202 of FIG. 2) can track the current location/pose according to data from position sensors (e.g., the position sensors 224 of FIG. 2). As a specific example, the robotic system 300 can locate one or more portions of the robotic arm 305 (e.g., the structural members and/or the joints thereof) in a kinetic chain according to data from the position sensors. The robotic system 300 can further calculate the location and/or pose of the end-effector 309 (and thereby a current location of at least a top surface of a target object 312 held by the end-effector 309), such as based on the location and orientation of the robotic arm 305. In some embodiments, the robotic system 300 can track the current location of the robotic arm 305 and/or the end-effector 309 based on processing other sensor readings (e.g., force readings or accelerometer readings), the executed actuation commands/settings and/or associated timings, or a combination thereof, such as according to a dead-reckoning mechanism.

Transferring (Registered and/or Unregistered) Objects

Figure 4:
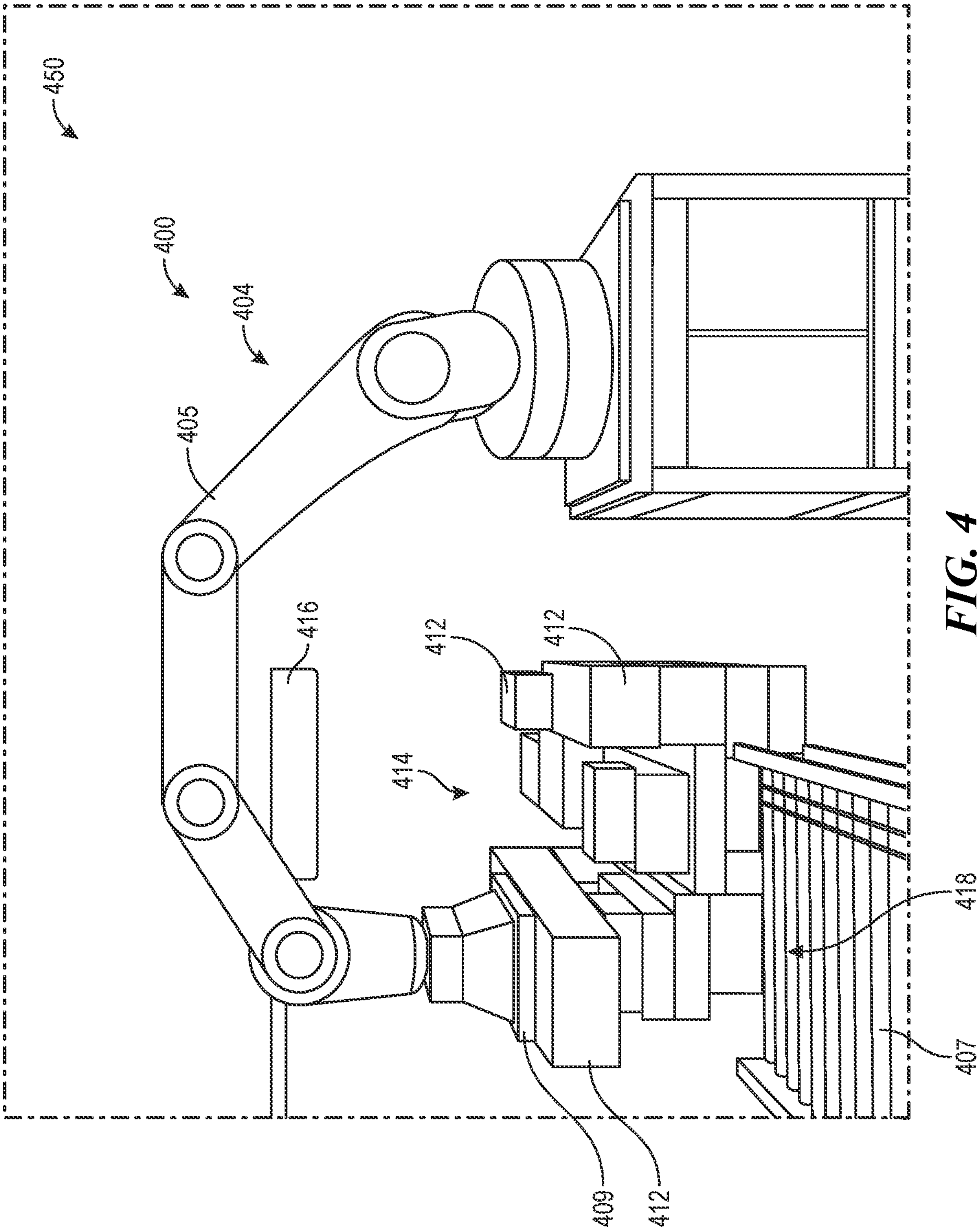
FIG. 4 is a partially schematic perspective view of another environment in which a robotic system with a coordinated transfer mechanism may operate in accordance with various embodiments of the present technology.

FIG. 4 is a partially schematic perspective view of another environment 450 in which a robotic system 400 with a coordinated transfer mechanism may operate in accordance with various embodiments of the present technology. As shown, the robotic system 400 includes a transfer unit 404 having a robotic arm 405 and an end-effector 409 (e.g., a gripper). The robotic system 400 can be the robotic system 100, 200, and/or 300 of FIGS. 1-3, or another robotic system of the present technology. In some embodiments, the robotic system 400 can be employed to transfer objects 412 from a source location 414 to a destination location 418. In the illustrated embodiment, the destination location 418 includes a designated region on a sending side of a conveyor 407.

The objects 412 at the source location 414 can include registered and/or unregistered objects. Registered objects include objects having one or more properties or characteristics that are included, stored, or registered in master data (e.g., the master data 246 of FIG. 2) of the robotic system 400 and that are therefore 'known' to the robotic system 400. Unregistered objects can include objects having one or more properties or characteristics that are not included, stored, or registered in the master data of the robotic system 400 and that are therefore (at least initially) 'unknown' to the robotic system 400. The one or more properties or characteristics of the registered and/or unregistered objects can include physical dimensions (e.g., length, width, and/or height dimensions of one or more sides of the objects), shape, center of mass location, weight, SKU, fragility rating, etc.

As shown in FIG. 4, objects 412 at the source location 414 can have one or more properties and/or characteristics that differ from one another. In other embodiments, objects 412 at the source location 414 can have uniform properties and/or characteristics. In the event unregistered objects 412 are present at the source location 414, the robotic system 400 can, in some embodiments, be provided maximum and/or minimum possible values for one or more properties or characteristics of the unregistered objects 412 (e.g., maximum and/or minimum possible dimensions of the unregistered objects 412). As discussed in greater detail below, the robotic system 400 can, based at least in part on the maximum and/or minimum possible values, derive motion plans for transferring the unregistered objects 412 from the source location 414 to the destination location 418.

The robotic system 400 can generate detection results corresponding to objects at the source location 414 consistent with the discussion above. For example, the robotic system 400 can include scanners or sensors 416 placed at, above, or about the source location 414. As a specific example, the robotic system 400 can include two-dimensional and/or three-dimensional imaging sensors 416 placed above the source location 414 such that the objects 412 at the source location 414 are within field(s) of view of the imaging sensors 416. The robotic system 400 can utilize the sensors 416 at the source location 414 to determine one or more properties or characteristics of the objects 412 at the source location 414, and/or to detect or identify objects 412 at the source location 414.

For example, in the case of a registered object 412 at the source location 414, the robotic system 400 can utilize information corresponding to the registered object 412 (e.g., that is captured by the sensors 416 at the source location 414) to detect or identify the registered object 412 and/or retrieve corresponding properties and/or characteristics from the master data. Continuing with this example, the robotic system 400 can derive a motion plan (e.g., a motion plan similar to the motion plan 330 of FIG. 3) for transferring the registered object 412 from the source location 414 to the destination location 418 based at least in part on the detected, retrieved, and/or known properties or characteristics corresponding to the registered object 412.

In the case of an unregistered object 412 at the source location 414, the robotic system 400 can utilize information corresponding to the unregistered object 412 that is captured by the sensors 416 at the source location 414 to detect or identify the unregistered object 412 and/or calculate one or more properties of the unregistered object 412. As a specific example, the robotic system 400 can utilize the sensors 416 at the source location 414 to image (e.g., a top surface of) an unregistered object 412 at the source location 414, and can use the image to estimate dimensions (e.g., a length and/or width of the top surface) of the unregistered object 412. In turn, the robotic system 400 can, based at least in part on the estimated dimensions of the unregistered object 412, derive a motion plan (e.g., similar to the motion plan 330 of FIG. 3) for transferring the unregistered object 412 from the source location 414 to the destination location 418.

In some embodiments, the robotic system 400 can, with and/or without knowledge of one or more properties or characteristics of the objects 412, calculate motion plans for grasping the objects 412, transferring the objects 412 to or about the destination location 418, and/or placing the objects 412 at the destination location 418. As a specific example, it may be difficult to accurately determine a height of a target object 412 at the source location 414. Continuing with this example, the robotic system 400 can therefore derive, based at least in part on a maximum possible height value and/or a minimum possible height value of all objects 412 at the source location 414 that is/are provided to the robotic system 400, a motion plan for engaging the target object 412 at the source location 414, transferring the target object 412 from the source location 414 toward the destination location 418, and/or placing the target object 412 at the destination location 418.

Figure 5:
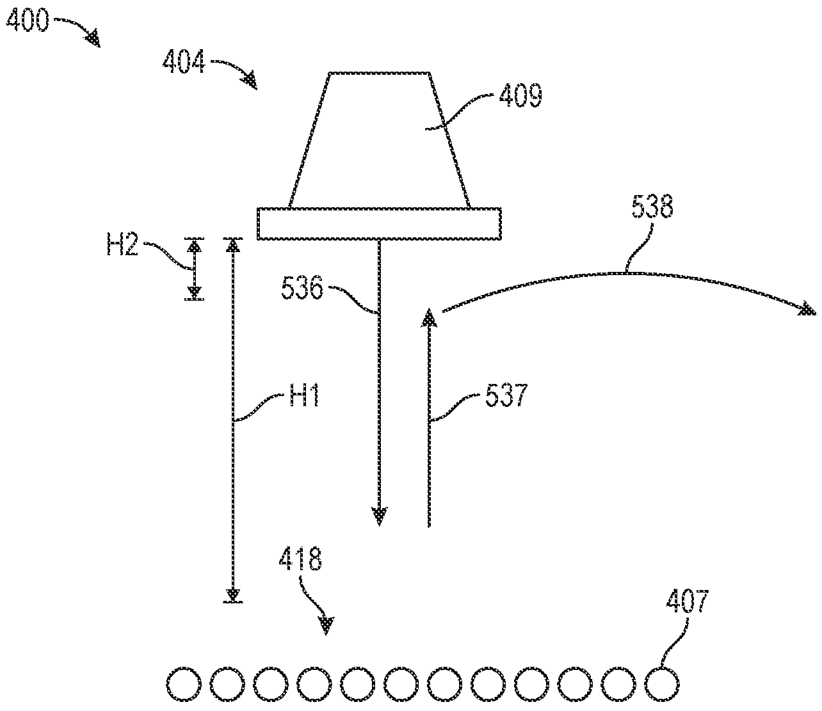
FIG. 5 is a partially schematic side view of the robotic system of FIG. 4 illustrating a specific example of an end-effector of the robotic system positioned over or about a destination location on a conveyor, in accordance with various embodiments of the present technology.

For clarity, consider the partially schematic side view of the robotic system 400 shown in FIG. 5 that illustrates a specific example of the end-effector 409 positioned over or about the destination location 418 on the conveyor 407. For the illustrated example, the robotic system 400 is provided (i) a maximum possible height (represented by the line segment H1) of the objects 412 (FIG. 4) at the source location 414 (FIG. 4), and/or (ii) a minimum possible height (represented by the line segment H2) of objects 412 at the source location 414. Continuing with this example, the robotic system 400 can derive (e.g., based on the maximum possible height H1 and/or the minimum possible height H2) one or more default or precalculated motion trajectories and/or corresponding motion speeds for a motion plan (e.g., similar to the motion plan 330 of FIG. 3) that can be implemented by the robotic system 400 to transfer a target object 412 from the source location 414 to the destination location 418. The default motion trajectories can include a default grasp approach path for engaging the target object 412, a default grasp depart path for moving the target object 412 away from the source location 414, one or more default transfer paths for positioning the end-effector 409 (and/or an object 412 engaged by the end-effector 409) to the location shown in FIG. 5, a default destination approach path 536 for moving the target object 412 toward and/or placing the target object 412 at the destination location 418, a default destination depart path 537 for moving the end-effector 409 away from the destination location 418, and/or a default return path 538 for returning the end-effector 409 to a start location. In some embodiments, the robotic system 400 can additionally calculate (e.g., precalculate) default speeds corresponding to one or more of the above default motion paths. The default speeds can specify speeds at which to move the end-effector 409 and/or the robotic arm 405 (FIG. 4) of the robotic system 400 while implementing the corresponding default motion path(s).

Without knowledge of the actual height of the target object 412, however, it may be difficult for the robotic system 400 to place the target object 412 at the destination location 418, even with the precalculated default motion paths/speeds. For example, without knowledge of the height of a target object, it may be difficult for the robotic system 400 to determine how far the robotic arm 405 of the transfer unit 404 should lower the target object 412 along the default destination approach path 536 and toward the destination location 418 before releasing the target object 412. In addition, because the robotic system 400 does not know a position of a bottom surface of the target object 412 relative to the end-effector 409, it is difficult to calculate an optimized grasp approach path, an optimized grasp depart path, an optimized transfer path, an optimized destination approach path, an optimized destination depart path, an optimized return path, and/or one or more corresponding optimized motion speeds, that reduce or minimize time spent transferring the target object 412 to the destination location 418 and/or returning the end-effector 409 to a start location.

Figure 6:
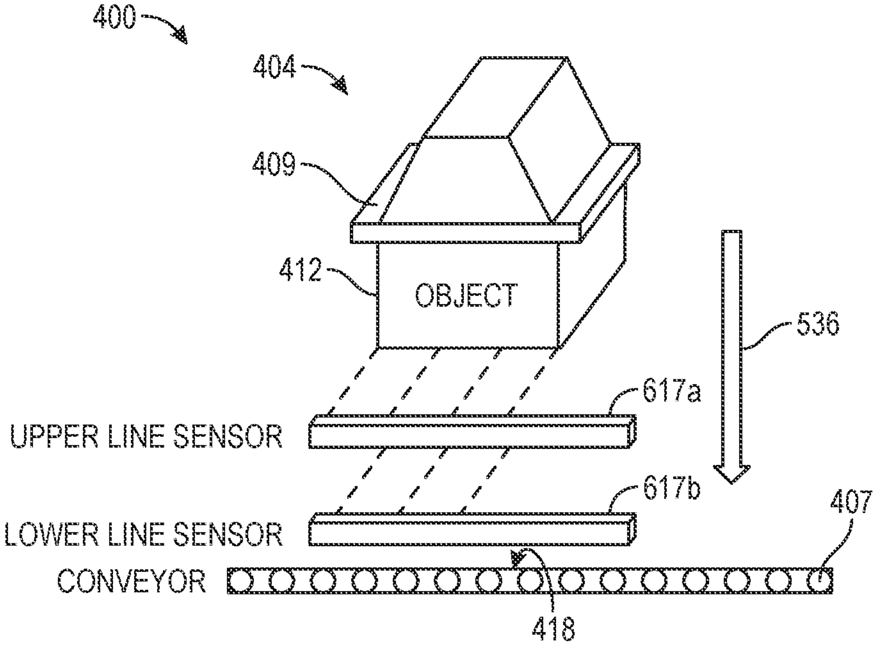
FIG. 6 is a partially schematic side view of the robotic system of FIG. 4 placing a target object at a destination location on a conveyor in accordance with various embodiments of the present technology.

Thus, the robotic system 400 can include one or more sensors in some embodiments for determining height measurements of the objects 412 and/or locations of bottom surfaces of the objects 412. For example, FIG. 6 is a partially schematic side view of the robotic system 400 placing a target object 412 at the destination location 418 on the conveyor 407. More specifically, FIG. 6 illustrates the end-effector 409 of the robotic system 400 gripping the target object 412 such that the target object 412 is positioned above or about the destination location 418 on the top of the rollers of the conveyor 407. The robotic system 400 is further shown as including an upper horizontal line sensor 617*a* and a lower horizontal line sensor 617*b*. In some embodiments, a position of the upper horizontal line sensor 617*a* and/or a position of the lower horizontal line sensor 617*b* (e.g., relative to the conveyor 407 and/or relative to each other) can be known to and/or tracked by the robotic system 400.

As the robotic system 400 lowers the target object 412 toward the destination location 418 along a default destination approach path 536, the upper horizontal line sensor 617*a* and/or the lower horizontal line sensor 617*b* can be used to detect a bottom surface of the target object 412 and/or determine a height of the target object 412. For example, as discussed above, the robotic system 400 can track a position of (e.g., a bottom surface of) the end-effector 409. Thus, when (i) the robotic system 400 lowers the target object 412 toward the destination location 418 and (ii) the upper horizontal line sensor 617*a* detects (e.g., a bottom surface of) the target object 412, the known vertical positions of the end-effector 409 and the upper horizontal line sensor 617*a* at the time the upper horizontal line sensor 617*a* detects the bottom surface of the target object 412 can be used to determine a height of the target object 412 using Equation 1 below:

Height of Target Object=Vertical Position of End-Effector−Vertical Position of Horizontal Line Sensor    Equation 1

In these and other embodiments, the robotic system 400 can use the lower horizontal line sensor 617*b* in addition to or in lieu of the upper horizontal line sensor 617*a* to determine the height of the target object 412 based on the known positions of the end-effector 409 and the lower horizontal line sensor 617*b* at the time the lower horizontal line sensor 617*b* detects the bottom surface of the target object 412.

Additionally, or alternatively, as the robotic system 400 lowers the target object 412 toward the destination location 418 along the destination approach path 536, the robotic system 400 can use the lower horizontal line sensor 617*b* to determine when to release or disengage the target object 412 to place the target object 412 at the destination location 418. For example, the lower horizontal line sensor 617*b* can be positioned at a location above the conveyor 407. The location can correspond to a specified distance (e.g., a release height) above the conveyor 407 at which the robotic system 400 can safely release the target object 412 to place the target object 412 at the destination location 418 (e.g., without damaging the target object 412, without risking the target object 412 falling off the conveyor 407, etc.). Continuing with this example, as the robotic system 400 lowers the target object 412 toward the destination location 418 along the destination approach path 536, the lower horizontal line sensor 617*b* can detect when a bottom surface of the target object 412 is positioned the specified distance above the conveyor 407. At this point, the robotic system 400 can release or disengage the target object 412 to place the target object 412 at the destination location 418.

There are several drawbacks, however, to utilizing horizontal line sensors similar to the upper horizontal line sensor 617*a* and/or the lower horizontal line sensor 617*b* for detecting heights of target objects 412 and/or determining when to release the target objects 412 to place them at the destination location 418. For example, the robotic system 400 is not able to detect a bottom surface of the target object 412 and/or is not able to calculate the height of the target object 412, until the bottom surface of the target object 412 is lowered to the height level of and detected by the upper horizontal line sensor 617*a* and/or by the lower horizontal line sensor 617*b*. Therefore, prior to lowering or otherwise placing the target object 412 within the field of view of the upper horizontal line sensor 617*a* and/or the field of view of the lower horizontal line sensor 617*b*, the robotic system 400 is unable to calculate optimized trajectories (e.g., a destination approach path, a destination depart path, and/or a return path) and/or corresponding optimized motion speeds that reduce or minimize time spent placing the target object 412 at the destination location 418 and/or returning the end-effector 409 to a start location.

In addition, the upper horizontal line sensor 617*a* and/or the lower horizontal line sensor 617*b* are generally located near or proximate to the destination location 418 on the conveyor 407. Thus, by the time (i) the upper horizontal line sensor 617*a* and/or the lower horizontal line sensor 617*b* detect a target object 412 and (ii) the robotic system 400 is able to determine the height of the target object 412 using the upper horizontal line sensor 617*a* and/or the lower horizontal line sensor 617*b*, the robotic system 400 may not have enough time to dynamically recalculate or adjust the default or precalculated trajectories (e.g., the precalculated destination approach path 536, a precalculated destination depart path, and/or a precalculated return path) and/or corresponding motion speeds to optimize such trajectories/speeds.

Furthermore, the position of the lower horizontal line sensor 617*b* relative to the conveyor 407 is typically fixed. Thus, without adjusting the position of the lower horizontal line sensor 617*b* relative to the conveyor 407, the robotic system 400 can be configured to release each target object 412 from a same height above the conveyor 407. In other words, the robotic system 400 is unable to adjust or tailor the release height for a target object 412 based on one or more properties or characteristics (e.g., weight, center of mass location, size, shape, etc.) of the target object 412.

Moreover, given the positions of the upper horizontal line sensor 617*a* and the lower horizontal line sensor 617*b* above the conveyor 407, the upper horizontal line sensor 617*a* and/or the lower horizontal line sensor 617*b* can pose as obstacles to returning the end-effector 409 to a start location. Thus, before moving the end-effector 409 along a return path to return the end-effector 409 to a start location, the robotic system 400 may be required to first move the end-effector 409 along a precalculated destination depart path to raise the end-effector 409 to a specified height that will clear the upper horizontal line sensor 617*a* and/or the lower horizontal line sensor 617*b*. Such movement of the end-effector 409 can correspond to delays in the process of returning the end-effector 409 to the start location after placing a target object at the destination location 418.

Figure 7B:
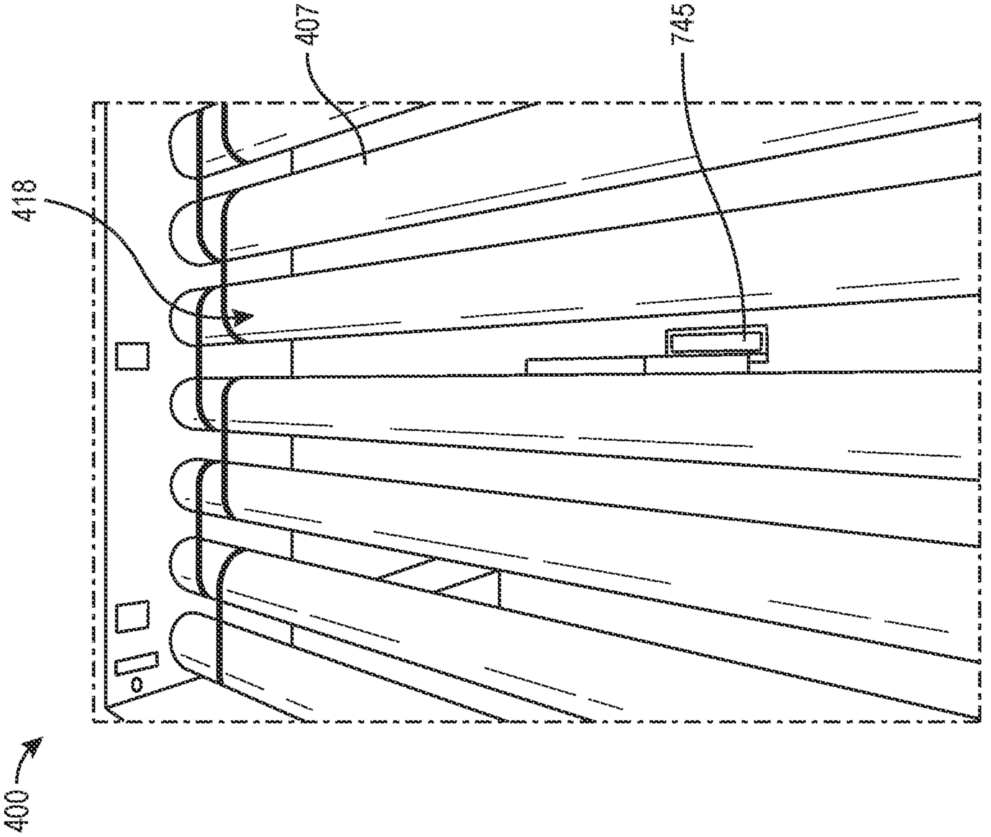
FIG. 7B is a partially schematic top perspective view of the sensor of FIG. 7A.
Figure 7A:
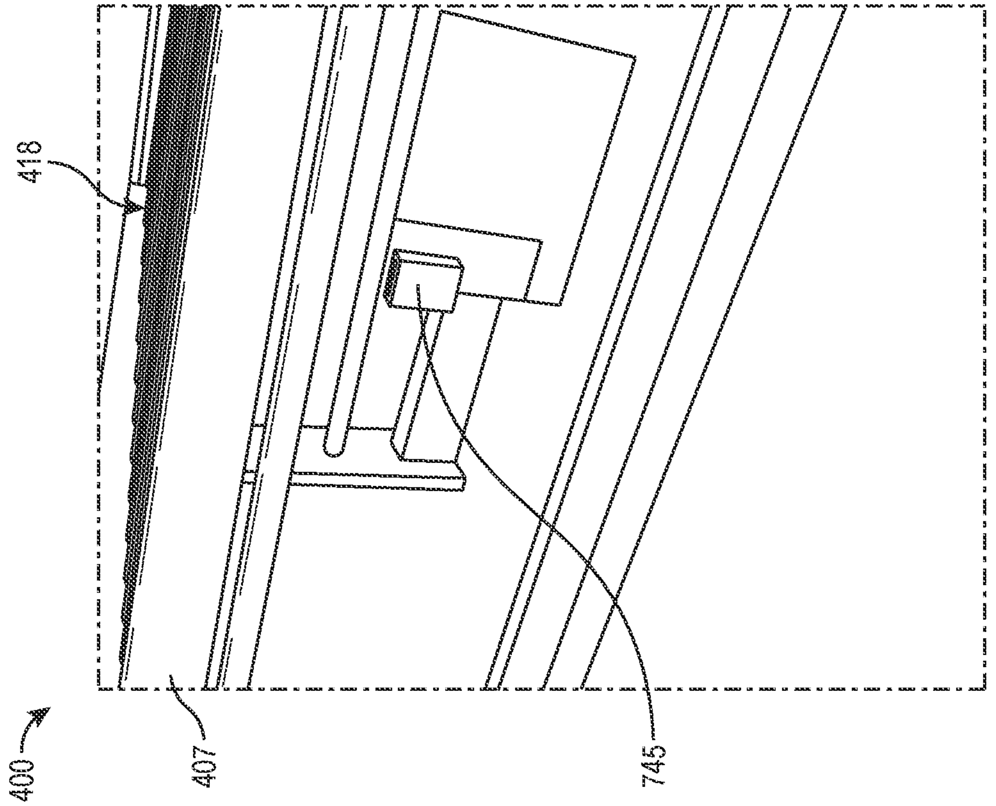
FIG. 7A is partially schematic side perspective view of a sensor configured in accordance with various embodiments of the present technology.

To address one or more of these concerns, the robotic system 400 may employ one or more vertically oriented sensors in addition to or in lieu of the upper horizontal line sensor 617*a* and/or the lower horizontal line sensor 617*b*. FIGS. 7A and 7B are partially schematic side perspective and top perspective views, respectively, of an example of such a vertically oriented sensor 745. In some embodiments, the sensor 745 can be a distance sensor or another suitable type of sensor. In the illustrated embodiment, the sensor 745 can be positioned beneath the conveyor 407 and the destination location 418. More specifically, the sensor 745 can be positioned such that a field of view of the sensor 745 (*i*) is directed upwards (vertically) and (ii) is at least partially unobstructed by rollers of the conveyor 407. In some embodiments, the position of the sensor 745 beneath the conveyor 407 can be fixed (e.g., such that a distance between the destination location 418 at the top surface of the rollers of the conveyor 407 and the sensor 745 is constant and/or known). As discussed in greater detail below, the sensor 745 can be configured to, through one or more gaps in rollers of the conveyor 407, monitor objects (e.g., the objects 412 (FIG. 4), the end-effector 409 (FIG. 4), etc.) positioned above the conveyor 407 and/or the destination location 418 (e.g., to determine height measurements of the objects 412).

Although shown beneath the conveyor 407 in the illustrated embodiment, the sensor 745 can be positioned at other locations within the robotic system 400. For example, the sensor 745 can be positioned at a location between the source location 414 (FIG. 4) and the destination location 418 in some embodiments. As another example, the sensor 745 can be positioned at or proximate the source location 414. As still another example, the sensor 745 can be positioned at or proximate the destination location 418, such as at a location that is not beneath the conveyor 407 and/or the destination location 418. In any of these other embodiments, the robotic system 400 can derive a motion plan (e.g., similar to the motion plan 330 of FIG. 3) that presents a target object 412 within the field of view of the sensor 745 such that the robotic system 400 can determine an actual height of the target object 412 while the robotic system 400 transfers the target object 412 between the source location 414 and the destination location 418.

Figure 8A:
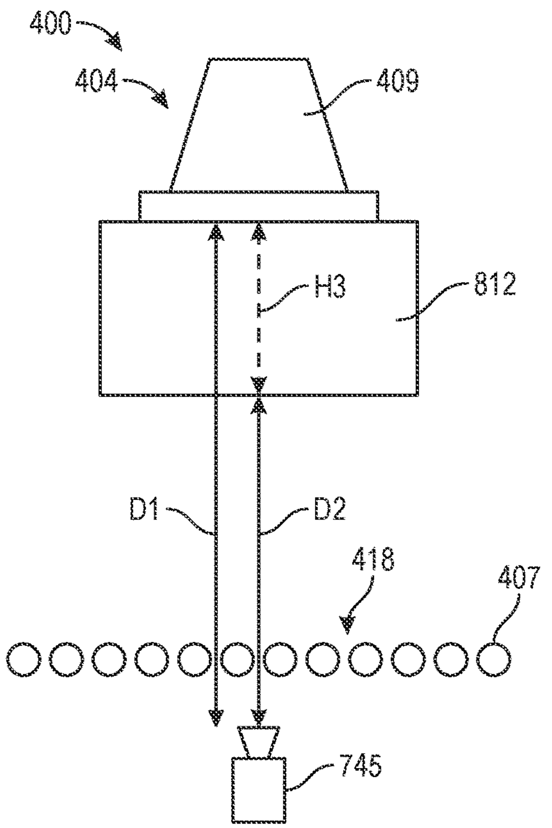
FIGS. 8A-8C are partially schematic side views of the end-effector of the robotic system of FIG. 4 placing a target object at a destination location on a conveyor, in accordance with various embodiments of the present technology.
Figure 8B:
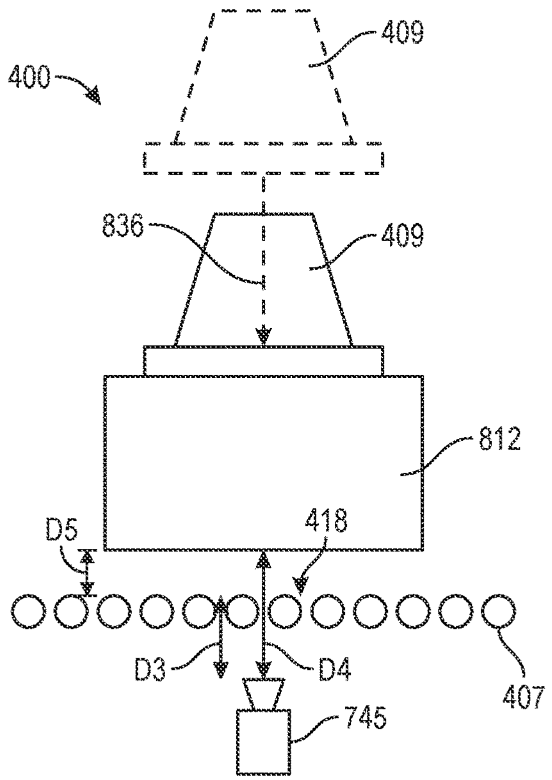
Figure 8C:
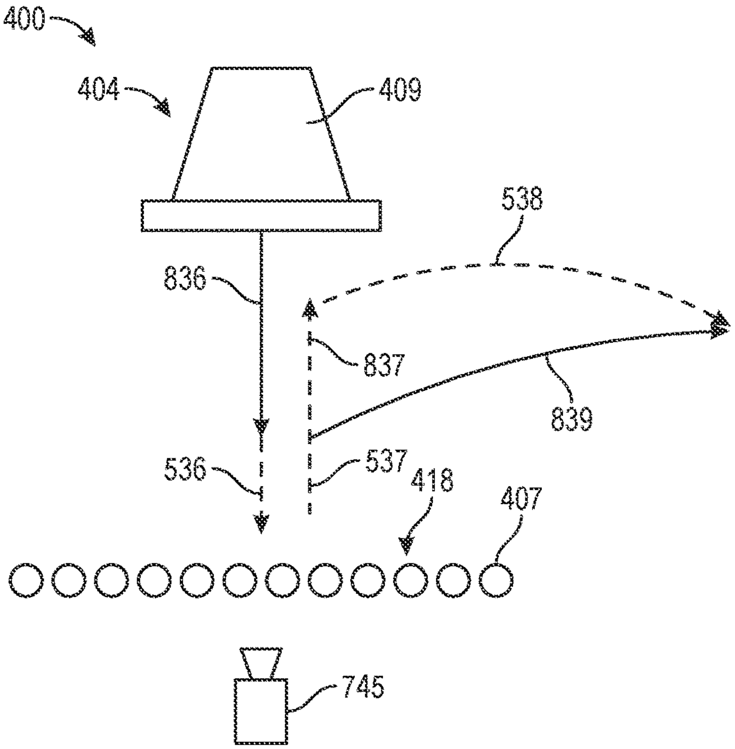

For the sake of example, consider FIGS. 8A-8C that are partially schematic side views of the end-effector 409 of the robotic system 400 placing a target object 812 (e.g., one of the objects 412 of FIG. 4) at the destination location 418 using the sensor 745 in accordance with various embodiments of the present technology. The target object 812 can be a registered or unregistered object. Additionally, or alternatively, the height of the target object 812 may or may not be known to the robotic system 400.

As shown in FIG. 8A, the end-effector 409 is positioned above the conveyor 407 and the destination location 418 such that a bottom surface of the target object 812 is within a field of view of the sensor 745 through a gap in rollers of the conveyor 407. As discussed above, the robotic system 400 can track a position of (e.g., a bottom surface of) the end-effector 409. Therefore, given that both the position of the end-effector 409 and the position of the sensor 745 are known to the robotic system 400, a distance (represented by arrow D1 in FIG. 8A) between the bottom surface of the end-effector 409 and the sensor 745 can also be known to the robotic system 400. Furthermore, when the target object 812 is presented within the field of view of the sensor 745, the robotic system 400 can determine a distance (represented by arrow D2 in FIG. 8A) between a bottom surface of the target object 812 and the sensor 745. Once (i) the distance D1 between the end-effector 409 and the sensor 745 is known and (ii) the distance D2 between the bottom surface of the target object 812 and the sensor 745 is known, the robotic system 400 can determine an actual height measurement of the target object 812 (represented by arrow H3 in FIG. 8A) using Equation 2 below:

Height of Target Object=Distance Between End-Effector and Sensor−Distance Between Target Object and Sensor, Equation 2 or H3=D1−D2 in the example illustrated in FIG. 8A. In some embodiments, the robotic system 400 can calculate the actual height measurement H3 of the target object 812 prior to moving the target object 812 toward the destination location 418 (e.g., prior to implementing a default or precalculated destination approach path, such as the default destination approach path 536 of FIG. 5). In other embodiments, the robotic system 400 can calculate the actual height measurement H3 of the target object 812 while moving the target object 812 toward the destination location 418 (e.g., while implementing a default or precalculated destination approach path, such as the default destination approach path 536 of FIG. 5).

Referring now to FIG. 8B, once the actual height measurement H3 of the target object 812 is known, the robotic system 400 can proceed to dynamically calculate a destination approach path 836 for moving the target object 812 toward the destination location 418. In some embodiments, dynamically calculating the destination approach path 836 can include dynamically adjusting or recalculating a precalculated/default destination approach path (e.g., the default destination approach path 536 of FIG. 5) for placing the target object 812 at the destination location 418. For example, given the actual height measurement H3 of the target object 812, the robotic system 400 can have knowledge of the location of the bottom surface of the target object 812 (e.g., relative to the bottom surface of the end-effector 409, relative to the top surface of the rollers of the conveyor 407, and/or relative to the sensor 745). Armed with this information, the robotic system 400 can determine a motion path (represented by the destination approach path 836 in FIG. 8B) along which to lower the end-effector 409 by a determined distance to position the bottom surface of the target object 812 a specified distance (represented by line segment D5 in FIG. 8B) above the destination location 418 at a top surface of the rollers of the conveyor 407 and/or a specified distance (represented by line segment D4 in FIG. 8B) above the sensor 745. Such specified distance(s) is/are also referred to herein as release heights.

In some embodiments, the release height D5 can be constant across placement of multiple target objects at the destination location 418. For example, the release height D5 can be invariable across placement of all target objects (including the target object 812) at the destination location 418. As another example, the release height D5 can correspond to a group of target objects (including the target object 812) such that the robotic system 400 is configured to release all target objects of the group from the release height D5. In both of these examples, the release height D5 can correspond to a specified distance above the conveyor 407 at which the robotic system 400 can safely release the multiple target objects to place those target objects at the destination location 418 (e.g., without damaging those target objects, without risking those target objects falling off the conveyor 407, etc.).

In some embodiments, the release height D5 can vary across placement of different target objects at the destination location 418. For example, the release height D5 can be variable and/or can depend at least in part on one or more properties or characteristics (e.g., weight, shape, center of mass location, fragility rating, etc.) of a given target object. As a specific example, the release height D5 for the target object 812 can be smaller when the target object 812 is heavier in weight and/or more fragile, and can be larger when the target object 812 is lighter in weight and/or less fragile. As another specific example, the release height D5 for the target object 812 can be smaller when a shape of the target object 812 and/or a size/shape of the bottom surface of the target object 812 pose a risk of the target object 812 rolling or otherwise falling off of the conveyor 407, and can be larger when the shape of the target object 812 and/or the size/shape of the bottom surface of the target object 812 are relatively flat or do not pose much of a risk of the target object 812 falling off the conveyor 407. In other words, in some embodiments, the release height D5 can be unique to the target object 812 and/or can correspond to one or more properties/characteristics of the target object 812. In some embodiments, the robotic system 400 can utilize one or more sensors (e.g., weight sensors, force sensors, imaging sensors, etc.) for determining one or more of the properties or characteristics of target objects, and/or can (e.g., dynamically) determine release heights for target objects based on properties/characteristics of target objects.

The robotic system 400 may employ any one or more of several possible methods for determining when the bottom surface of the target object 812 is at the release height D5. For example, the robotic system 400 can determine that the bottom surface of the target object 812 is at the release height D5 by monitoring motion of the end-effector 409. For example, a location of the destination location 418 at the top of the rollers of the conveyor 407 may be known to the robotic system 400. Thus, the robotic system 400 may know a vertical distance between the bottom surface of the end-effector 409 and the top of the rollers of the conveyor 407. As such, the robotic system 400 can determine that the bottom surface of the target object 812 is at the release height D5 when a vertical distance of the bottom surface of the end-effector 409 above the rollers of the conveyor 407 less the actual height measurement H3 of the target object 812 is equivalent to the release height D5. This is represented by Equation 3 below:

Vertical Height of Target Object Above Destination Location=Vertical Height of Bottom Surface of End-Effector Above Destination Location−Actual Height Measurement of Target Object    Equation 3

Thus, using Equation 3 above, the robotic system 400 can determine that a bottom surface of the target object 812 is at the release height D5 when the Vertical Height of Target Object Above Destination Location value is equivalent to the specified and/or determined release height D5.

Additionally, or alternatively, the robotic system 400 can determine that the bottom surface of the target object 812 is at the release height D5 by monitoring motion of the end-effector 409 relative to the position of the end-effector 409 at a time (t0) the robotic system 400 determines the actual height measurement H3 of the target object 812 using the sensor 745 (e.g., relative to the position of the end-effector 409 shown in FIG. 8A). In such embodiments, the robotic system 400 can determine that the bottom surface of the target object 812 is at the release height D5 using Equation 4 below:

Vertical Height of Target Object Above Destination Location=Vertical Height of Bottom Surface of End-Effector Above Destination Location at Time *t*0−Vertical Distance Traversed by End-Effector Along Destination Approach Path Since Time *t*0−Actual Height Measurement of Target Object    Equation 4

Thus, using Equation 4 above, the robotic system 400 can determine that a bottom surface of the target object 812 is at the release height D5 when the Vertical Height of Target Object Above Destination Location value is equivalent to the specified and/or determined release height D5.

In these and still other embodiments, a distance (represented by line segment D3 in FIG. 8B) between the sensor 745 and the destination location 418 at the top of the rollers of the sensor 745 may be known to the robotic system 400. Additionally, or alternatively, the robotic system 400 can utilize the sensor 745 to determine the distance between the sensor 745 and the bottom surface of the target object 812. Thus, the robotic system 400 can determine that the bottom surface of the target object 812 is at the release height D5 using Equations 5 and/or Equation 6 below:

Vertical Height of Target Object Above Destination Location=Distance Between Sensor and Bottom Surface of Target Object−Distance Between Sensor and Destination Location    Equation 5

Vertical Height of Target Object Above Destination Location=Distance Between End-Effector and Sensor−Actual Height Measurement of Target Object−Distance Between Sensor and Destination Location    Equation 6

Thus, using Equation 5 and/or Equation 6 above, the robotic system 400 can determine that a bottom surface of the target object 812 is at the release height D5 when the Vertical Height of Target Object Above Destination Location value is equivalent to the specified and/or determined release height D5.

Returning to discussion of the destination approach path 836 illustrated in FIG. 8B, the robotic system 400 can utilize knowledge of the location of the bottom surface of the target object 812 to (e.g., dynamically) determine a speed by which to lower the target object 812 toward the destination location 418 along the destination approach path 836. For example, without knowledge of the height of the target object 812 and/or the location of the bottom surface of the target object 812, the robotic system 400 may be required to slowly lower the target object 812 toward the destination location 418 (*a*) to mitigate damage to the target object 812 and/or the robotic system 400 in the event of a collision between the target object 812 and the robotic system 400, (b) to provide adequate time for the robotic system 400 to determine a location of the bottom surface of the target object 812 and/or a height of the target object 812 (e.g., using the upper horizontal line sensor 617*a* and/or the lower horizontal line sensor 617*b* of FIG. 6) before the target object 812 reaches the conveyor 407, and/or (c) to provide adequate time for the robotic system 400 to calculate (e.g., recalculate) a destination approach path, a destination depart path, and/or a return path. As discussed above, however, the robotic system 400 can use the sensor 745 to determine the actual height measurement H3 of the target object 812 and the location of the bottom surface of the target object 812, such as prior to implementing and/or at a relatively early stage of implementing a default destination approach path. In addition, the robotic system 400 can use the sensor 745 to (e.g., continuously) monitor a position of (e.g., the bottom surface of) the target object 812 while the end-effector 409 lowers the target object 812 toward the destination location 418. Thus, because the robotic system 400 knows and/or can monitor the height of the target object 812 above the destination location 418 and/or the location of the bottom surface of the target object 812, the risk of collision between the target object 812 and the robotic system 400 can largely be reduced, minimized, and/or eliminated. And because the robotic system 400 can determine the actual height measurement H3 of the target object 812 and/or the position of the bottom surface of the target object 812 prior to or relatively early in the process of moving/lowering the target object 812 toward the destination location 418, the robotic system 400 can be provided sufficient time to (e.g., dynamically) calculate/recalculate the destination approach path 836, a destination depart path, and/or a return path. As such, knowledge of the height of the target object 812 above the destination location 418 and/or the position of the bottom surface of the target object 812 enables the robotic system 400 to lower the target object 812 to the release height D5 more quickly (e.g., at an increased speed) along a destination approach path than is possible without knowledge of the height of the target object 812 and/or the location of the bottom surface of the target object 812. In some embodiments, the robotic system 400 can dynamically determine this increased speed once it knows the actual height measurement H3 and/or the location of the bottom surface of the target object 812. In some scenarios, the increased speed with which the robotic system 400 lowers the target object 812 toward the destination location 418 can translate to the robotic system 400 taking less time to place the target object 812 at the destination location 418.

Moreover, knowledge of the actual height measurement H3 of the target object 812 can facilitate the robotic system 400 dynamically calculating (e.g., dynamically recalculating) destination depart paths and/or return paths for the robotic system 400. For example, knowing the actual height H3 can enable the robotic system 400 to determine a location of a top surface of the target object 812 (and therefore the bottom surface of the end-effector 409) when the bottom surface of the target object 812 is positioned at the release height D5. Thus, knowledge of the actual height H3 of the target object 812 can facilitate calculating a destination depart path and/or a return path starting from a location that the end-effector 409 will be positioned when the bottom surface of the target object 812 is positioned at the release height D5 and/or when the end-effector 409 disengages (e.g., drops) the target object 812. Furthermore, as discussed above, in embodiments in which the actual height H3 of the target object 812 is calculated by the robotic system 400 at or near a start of the destination approach path 836 (e.g., prior to or while the robotic system 400 moves the target object 812 along the destination approach path 836), the robotic system 400 can have ample time to dynamically calculate the destination depart path and/or the return path.

Referring to FIG. 8C for the sake of example and clarity, the robotic system 400 can use the actual height measurement H3 of the target object 812 to determine that, when a bottom surface of the target object 812 is positioned at the release height D5 (FIG. 8B), a bottom surface of the end-effector 409 will be positioned at a location corresponding to the intersection of the default destination depart path 537 and arrow 839. Thus, in some embodiments (e.g., in embodiments in which the robotic system 400 includes the upper horizontal line sensor 617*a* and/or the lower horizontal line sensor 617*b* that pose as obstacles to the end-effector 409), the robotic system 400 can (e.g., dynamically) recalculate the default destination depart path 537 to generate an updated destination depart path 837 (representing a top portion or segment of the default destination depart path 537). In these embodiments, after moving the end-effector 409 along a path corresponding to the updated destination depart path 837 (e.g., to position the end-effector 409 at a specified height, such as to avoid the upper horizontal line sensor 617*a* and/or the lower horizontal line sensor 617*b*), the robotic system 400 can proceed to return the end-effector 409 to a start location by moving the end-effector 409 along the default return path 538.

In other embodiments, such as (i) in embodiments in which the robotic system 400 does not include the upper horizontal line sensor 617*a* and/or the lower horizontal line sensor 617*b*, or (ii) in embodiments in which the upper horizontal line sensor 617*a* and/or the lower horizontal line sensor 617*b* do not pose as obstacles to the end-effector 409, the robotic system 400 can (e.g., dynamically) calculate a hybrid return path 839. As shown in FIG. 8C, the hybrid return path 839 represents a combination of the updated destination depart path 837 and the default return path 538, or a combined recalculation of the default destination depart path 537 and the default return path 538. In other words, the hybrid return path 839 can represent a 'shortcut' between a start of the updated destination depart path 837 and an end of the default return path 538. Thus, rather than first lifting the end-effector 409 to a specified height corresponding to the updated destination depart path 837 shown in FIG. 8C, the robotic system 400 can (e.g., immediately) start moving the end-effector 409 (e.g., horizontally) toward a start location (e.g., at or proximate the source location 414 shown in FIG. 4) along the hybrid return path 839. This can reduce the time required for returning the end-effector 409 to the start location following placement of the target object 812 at the destination location 418.

In other words, use of the sensor 745 of the robotic system 400 to determine an actual height measurement H3 of the target object 812 can facilitate the robotic system 400 (e.g., dynamically) calculating optimized destination approach paths, optimized destination approach speeds, optimized destination depart paths, optimized return paths, and/or optimized hybrid 'shortcut' return paths. Additionally, in embodiments in which the sensor 745 is positioned at other locations (e.g., at or proximate the source location 414, between the source location 414 and the destination location 418, etc.), the robotic system 400 can utilize the sensor 745 to determine the actual height measurement H3 of the target object 812 at a point further upstream in the corresponding motion plan for the end-effector 409. In such embodiments, the robotic system 400 can (e.g., dynamically) calculate or optimize other paths (e.g., a source approach path, a grasp approach path, a grasp depart path, and/or a transfer path) for transferring the target object 812 from the source location 414 to the destination location 418.

Figure 9A:
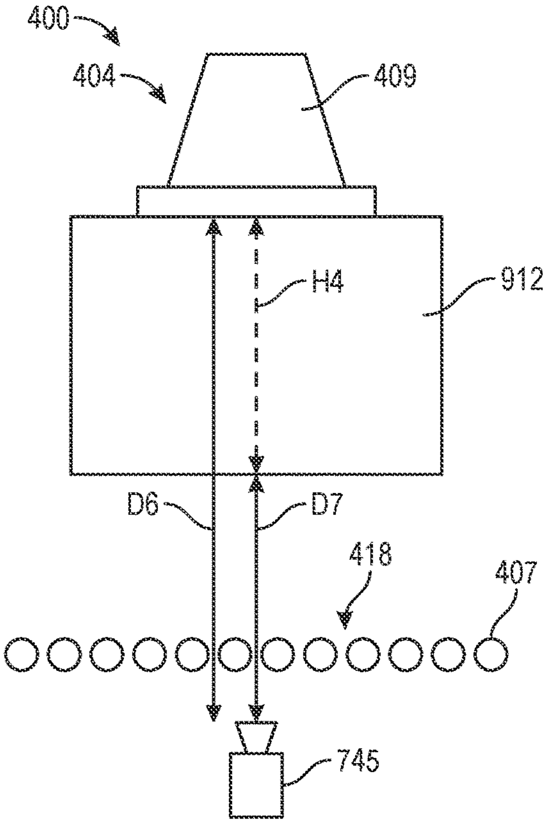
FIGS. 9A-9C are partially schematic side views of the end-effector of the robotic system of FIG. 4 placing another target object at the destination location on the conveyor, in accordance with various embodiments of the present technology.
Figure 9B:
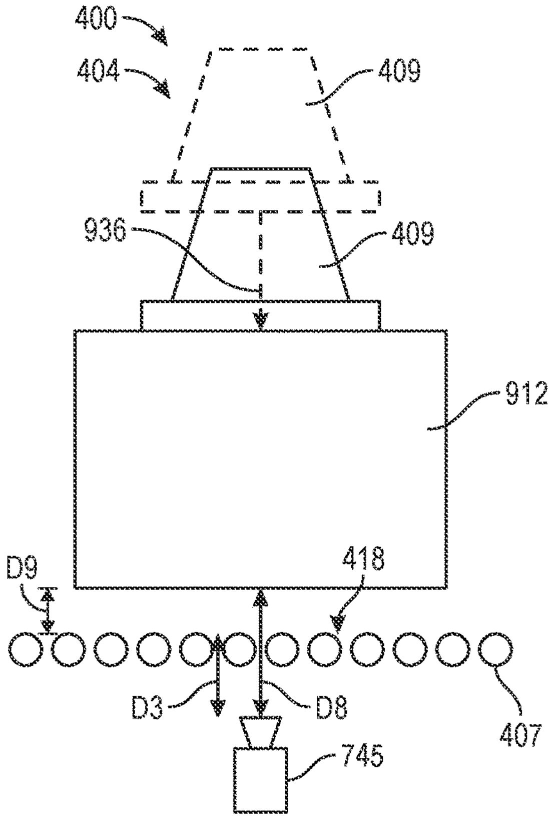
Figure 9C:
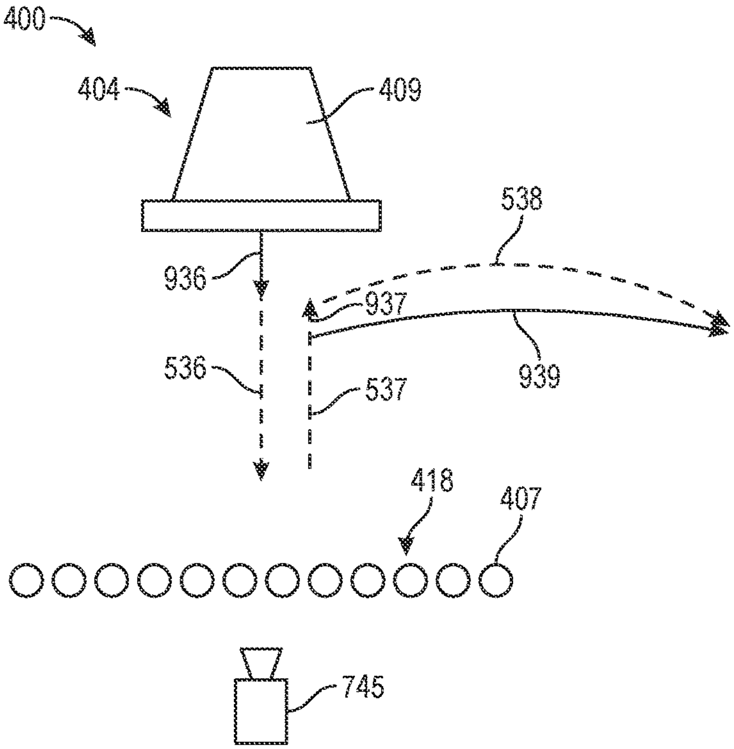

FIGS. 9A-9C are partially schematic side view of the end-effector 409 of the robotic system 400 placing another target object 912 (e.g., another one of the objects 412 of FIG. 4) at the destination location 418 using the sensor 745 in accordance with various embodiments of the present technology. The target object 912 can be a registered or unregistered object. In addition, the height of the target object 912 may or may not be known to the robotic system 400. Additionally, or alternatively, one or more properties or characteristics (e.g., weight, length, width, height, center of mass location, fragility rating, etc.) may be identical to, similar to, or different from corresponding properties/characteristics of the target object 812 discussed above with reference to FIGS. 8A-8C.

As shown in FIG. 9A, the end-effector 409 is positioned above the conveyor 407 and the destination location 418 such that a bottom surface of the target object 912 is within the field of view of the sensor 745 through a gap in rollers of the conveyor 407. The position of the end-effector 409 in FIG. 9A can be a same position as or a different position from the position of the end-effector 409 in FIG. 8A. Using the sensor 745, the robotic system 400 can determine an actual height measurement H4 of the target object 912 and/or a location of the bottom surface of the target object 912 in a manner consistent with the discussion above. For example, the robotic system 400 can determine the actual height measurement H4 for the target object 912 using (i) a known distance D6 between the end-effector 409 and the sensor 745 and (ii) a measured distance D7 between the bottom surface of the target object 912 and the sensor 745.

Referring now to FIG. 9B, once the actual height measurement H4 of the target object 912 is known, the robotic system 400 can, consistent with the discussion of FIGS. 8A-8C above, proceed to (e.g., dynamically) calculate/recalculate (i) a destination approach path 936 for moving the target object 912 toward the destination location 418, and/or (ii) a destination approach speed for moving/lowering the target object 912 toward the destination location 418. The destination approach path 936 can be identical to, similar to, or different from the destination approach path 836 for the target object 812 of FIG. 8B. Additionally, or alternatively, the destination approach speed for placing the target object 912 at the destination location 418 can be identical to, similar to, or different from the destination approach speed used for placing the target object 812 of FIGS. 8A and 8B at the destination location 418. After or while calculating the destination approach path 936 and/or the destination approach speed, the robotic system 400 can implement the destination approach path 936 to begin moving/lowering the target object 912 toward the destination location 418 (e.g., to position the bottom surface of the target object 912 at a release height D9 above the destination location 418 at the top of the rollers of the conveyor 407 and/or at a release height D8 above the sensor 745).

In some embodiments, the robotic system 400 can (e.g., dynamically) determine the release height D9 and/or the release height D8. For example, the robotic system 400 can determine the release height D9 and/or the release height D8 based at least in part on one or more properties or characteristics of the target object 912, consistent with the discussion of FIGS. 8A-8C above. The release height D9 and/or the release height D8 for the target object 912 can be the same as or different from the release height D5 and/or the release height D4, respectively, for the target object 812 of FIGS. 8A and 8B.

Referring to FIG. 9C, once the robotic system 400 knows the release height D9 or the release height D8 for the target object 912 and/or knows the position of a top surface of the target object 912 when the bottom surface of the target object 912 is positioned at the release height D9/D8, the robotic system 400 can (e.g., dynamically) calculate/recalculate a destination depart path 937 for raising the end-effector 409 to a specified height after placing the target object 912 at the destination location 418, a return path 538 for returning the end-effector 409 to a start location after raising the end-effector 409 to the specified height along the destination depart path 937, and/or a hybrid 'shortcut' return path 939 for returning the end-effector 409 to the start location after placing the target object 912 at the destination location 418. The destination depart path 937, the default return path 538, and/or the hybrid return path 939 can be identical to, similar to, or different from the destination depart path 837, the default return path 538, and/or the hybrid return path 839, respectively, discussed above with reference to FIG. 8C.

Accordingly, use of the sensor 745 in the robotic system 400 can facilitate realization of several advantages over robotic systems that lack such a sensor. For example, the robotic system 400 can use the sensor 745 to determine an actual height of a target object at an early stage of a corresponding motion plan (e.g., prior to or while moving the target object along a destination approach path). As such, the robotic system 400 can be provided sufficient time to (e.g., dynamically) calculate, recalculate, and/or optimize various motion paths and/or corresponding speeds (e.g., transfer paths, destination return paths, destination approach speeds, release heights, destination depart paths, return paths, hybrid return paths, etc.) included in the motion plan. In turn, time spent by the robotic system 400 placing target objects at the destination location 418 can be reduced and/or minimized in comparison to robotic systems that lack a sensor similar to the sensor 745.

Furthermore, use of the vertically oriented sensor 745 to determine actual height measurements and/or positions of bottom surfaces of target objects relative to the destination location 418 at the top of the rollers of the conveyor 407 can facilitate the robotic system 400 altering, adjusting, tailoring, and/or customizing release heights for different target objects (e.g., based on one or more properties or characteristics of those target objects), and without needing to adjust a position of the sensor 745.

Moreover, the sensor 745 can be positioned beneath the conveyor 407 and/or out of the way of the end-effector 409, and/or can be used in lieu of horizontal line sensors (e.g., one or both of the upper horizontal line sensor 617*a* and the lower horizontal line sensor 617*b* of FIG. 6) that can pose as obstacles to returning the end-effector 409 to a start location. Thus, use of the sensor 745 can facilitate omitting such horizontal line sensors from the robotic system 400, which can facilitate moving the end-effector (e.g., immediately) toward a start location along a hybrid 'shortcut' return path after placing a target object at the destination location 418 (e.g., without first needing to move the end-effector 409 to a specified height). In turn, this can reduce and/or minimize time spent by the robotic system 400 transferring target objects between the source location 414 and the destination location 418.

Operational Flow

Figure 10:
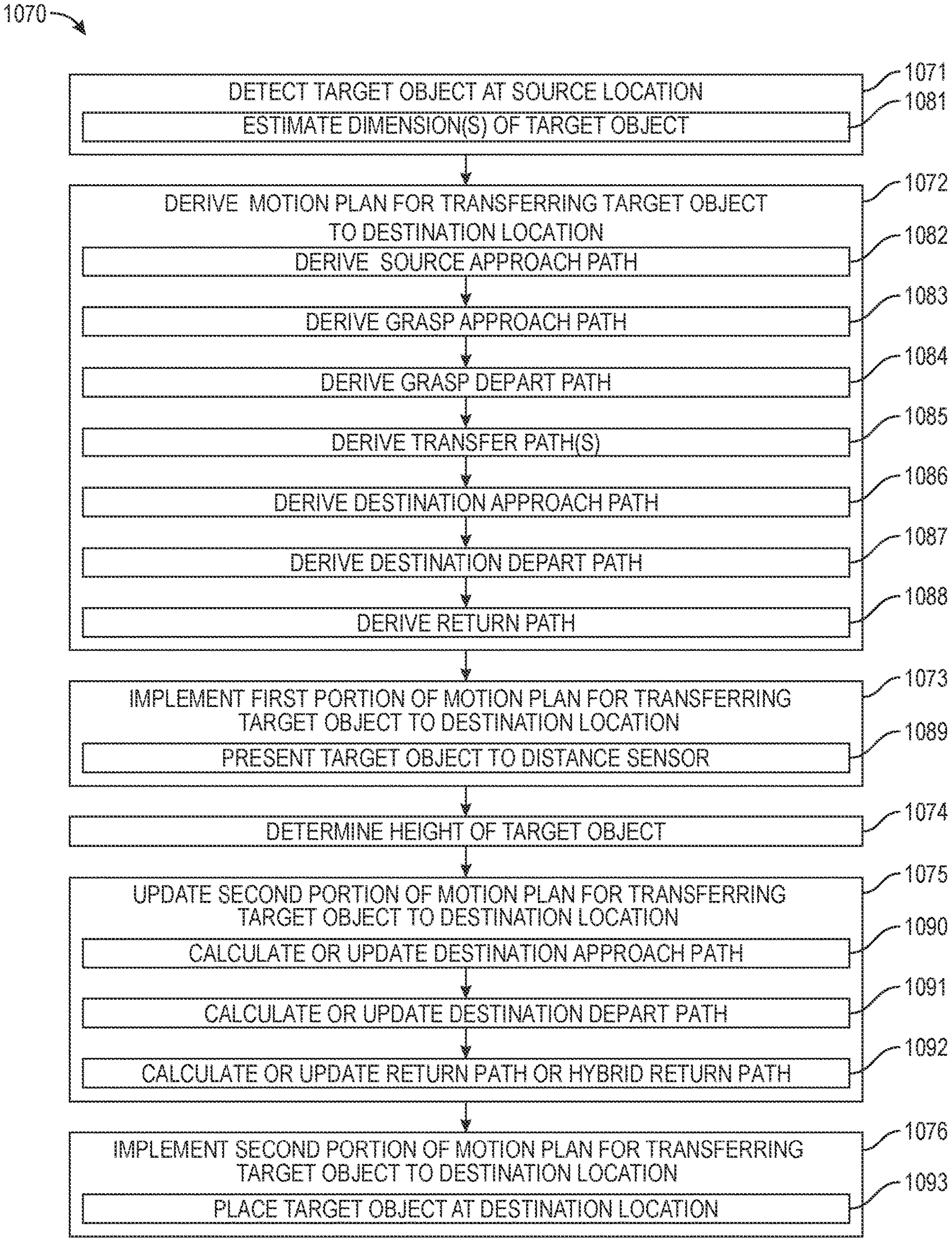
FIG. 10 is a flow diagram illustrating a method of operating a robotic system in accordance with various embodiments of the present technology.

FIG. 10 is a flow diagram illustrating a method 1070 of operating a robotic system in accordance with various embodiments of the present technology. For example, the method 1070 can be a method of operating the robotic system for transferring objects (registered and/or unregistered) between a source location and a destination location. The robotic system can be the robotic system 100 of FIG. 1, the robotic system 200 of FIG. 2, the robotic system 300 of FIG. 3, the robotic system 400 of FIGS. 4-9C, and/or another robotic system of the present technology. The method 1070 is illustrated as a set of steps or blocks 1071-1076, with corresponding subblocks 1081-1093. All or a subset of one or more of the blocks 1071-1076 and/or all or a subset of one or more of the subblocks 1081-1093 can be executed by various components of the robotic system (e.g., by various components illustrated in any one or more of FIGS. 1-9C discussed above). Furthermore, all or a subset of one or more of the blocks 1071-1076 and/or all or a subset of one or more of the subblocks 1081-1093 can be executed in accordance with the discussion above.

The method 1070 begins at block 1071 by detecting a target object at a source location. The target object can be a registered or unregistered object. Additionally, or alternatively, the source location can be a pallet, a bin, a designated region on a conveyor, a stack of objects including the target object, etc.

Detecting the target object can include detecting the target object using one or more sensors of the robotic system. For example, detecting the target object can include using one or more imaging sensors to image a designated area and identify a source location. As another example, detecting the target object can include using one or more imaging sensors to image the target object. Based on one or more images of the designated area and/or on one or more images of the target object, the robotic system can identify the source location and/or the target object at the source location.

As shown at subblock 1081, detecting the target object can include estimating at least some of the dimensions for the target object. For example, detecting the target object can include using one or more imaging sensors to image a portion (e.g., a top surface) of the target object. Continuing with this example, detecting the target object can include estimating dimensions (e.g., a length, a width, etc.) of the portion of the target object based at least in part on images of the target object.

At block 1072, the method 1070 continues by deriving a motion plan for transferring the target object to a destination location, such as from the source location to the destination location. In some embodiments, deriving the motion plan can include deriving the motion plan based on one or more properties or characteristics of the target object registered in master data of the robotic system. In these and other embodiments, deriving the motion plan can include deriving the motion plan based on default values (e.g., provided to the robotic system), such as a maximum possible height value for the target object and/or a minimum possible height value for the target object. Additionally, or alternatively, deriving the motion plan for transferring the target object can include determining one or more motion paths and/or one or more corresponding motion speeds for moving the robotic system (e.g., a robotic arm and/or an end-effector of the robotic system) and/or the target object toward the destination location.

For example, referring to subblocks 1082-1084, deriving the motion plan can include deriving a source approach path for moving the end-effector to a location at or proximate the source location; deriving a grasp approach path for maneuvering the end-effector to the target object and operating the end-effector to engage (e.g., grip) the target object; and/or deriving a grasp depart path for moving/raising the target object away from the source location after the target object is engaged by the end-effector. Additionally, or alternatively, referring to subblock 1085, deriving the motion plan can include deriving one or more transfer paths for moving the target object between the source location and the destination location. In these and other embodiments, referring to subblocks 1086-1089, deriving the motion plan can include deriving a destination approach path for placing the target object at the destination location; deriving a destination depart path for moving the end-effector away from the destination location and/or to a specified height; and/or deriving a return path for moving the end-effector to a start location (e.g., at or proximate the source location, such as for transferring another object from the source location to the destination location).

At block 1073, the method 1070 continues by implementing a first portion of the motion plan for transferring the target object to the destination location. Implementing the first portion of the motion plan can include moving the robotic system (e.g., the robotic arm and/or the end-effector) toward the source location in accordance with the source approach path; moving the robotic system to the target object and/or operating the robotic system such that the end-effector engages the target object in accordance with the grasp approach path; and/or moving the robotic system and the target object away from the source location in accordance with the grasp depart path. Additionally, or alternatively, implementing the first portion of the motion plan can include moving the robotic system (e.g., the robotic arm and/or the end-effector) toward the destination location in accordance with the transfer path(s). In these and still other embodiments, implementing the first portion of the motion plan can include moving the target object toward the destination location in accordance with at least part of the destination approach path.

As shown in subblock 1089, implementing the first portion of the motion plan can include presenting the target object to a sensor, such as a distance sensor similar to the distance sensor 745 discussed in detail above. Presenting the target object to the sensor can include positioning the target object above the sensor and/or within a field of view of the sensor. In embodiments in which the sensor is positioned beneath a destination location located at a top surface of rollers of a conveyor, presenting the target object to the sensor can include positioning the target object above the destination location and within a field of view of the sensor that extends unobstructed through a gap between rollers of the conveyor. Alternatively, in embodiments in which the sensor is positioned at another location, such as at a location between the source location and the destination location, presenting the target object to the sensor can include positioning the target object at a location within the field of view of the sensor at the other location. In these and other embodiments, presenting the target object to the sensor includes positioning the target object such that (i) the target object is within a field of view of the sensor and (ii) the end-effector of the robotic system is positioned on a side of the target object opposite the sensor.

At block 1074, the method 1070 continues by determining a height of the target object. Determining the height of the target object can include determining a first distance between a portion of the robotic system and the sensor. For example, determining the height of the target object can include determining a first distance between a bottom surface of the end-effector of the robotic system and the sensor. Continuing with this example, determining the first distance can include tracking or otherwise determining the location of the bottom surface of the end-effector. Determining the height of the target object can additionally, or alternatively, include determining a second distance between the target object and the sensor. For example, determining the second distance can include receiving (e.g., from the sensor) sensor data indicative of the second distance. Additionally, or alternatively, determining the second distance can include determining the second distance based at least in part on the sensor data and/or between the bottom surface of the target object and the sensor. In these and other embodiments, determining the height of the target object can include determining the height of the target object based at least in part on the first distance and/or the second distance. For example, determining the height of the target object can include determining the height of the target object as a difference between the first distance and the second distance.

At block 1075, the method 1070 continues by calculating (e.g., deriving) or updating (e.g., adjusting, altering, recalculating, etc.) a second portion of the motion plan for transferring the target object to the destination location. Calculating or updating the second portion of the motion plan can include calculating or updating the second portion of the motion plan based at least in part on the height of the target object determined at block 1074. In these and other embodiments, calculating or updating the second portion of the motion plan can include dynamically calculating or updating all or a subset of the second portion of the motion plan. In these and still other embodiments, calculating or updating the second portion of the motion plan includes calculating or updating the second portion of the motion plan prior to implementing all or a first subset of the second portion of the motion plan and/or while implementing all or a second subset of the second portion of the motion plan.

As shown in subblock 1091, calculating or updating the second portion of the motion plan can include calculating or updating a destination approach path and/or a corresponding destination approach speed. Calculating or updating the destination approach path can include determining a release height for the target object. Determining the release height for the target object can include determining the release height based at least in part on one or more properties or characteristics of the target object. Calculating or updating the destination approach path and/or the corresponding destination approach speed can include optimizing the destination approach path and/or the corresponding destination approach speed to minimize or reduce time spent by the robotic system placing the target object at the destination location.

As shown in subblock 1092, calculating or updating the second portion of the motion plan can include calculating or updating a destination depart path and/or a corresponding destination depart speed. Calculating or updating the destination depart path can include determining a height and/or location to which the robotic system raises the end-effector after placing the target object at the destination location. Determining the height and/or location can include determining a height and/or location that avoid horizontal line sensors and/or other components of the robotic system. Calculating or updating the destination depart path and/or the corresponding destination depart speed can include optimizing the destination depart path and/or the corresponding destination depart speed to minimize or reduce time spent by the robotic system moving to the determined height and/or location for the end-effector after placing the target object at the destination location.

As shown in subblock 1093, calculating or updating the second portion of the motion plan can include calculating or updating a return path and/or a corresponding return speed. Calculating or updating the return path can include determining or updating a path by which to return the end-effector of the robotic system to a start location (e.g., after raising the end-effector to the height and/or location specified by the destination depart path). Calculating or updating the return path and/or the corresponding return speed can include optimizing the return path and/or the corresponding return speed to minimize or reduce time spent by the robotic system moving the end-effector from the height/location specified by the destination depart path to the start location.

Alternatively, calculating or updating the return path and/or a corresponding return speed can include determining a path by which to return the end-effector of the robotic system to a start location after placing the target object at the destination location. Calculating or updating the return path can include determining a path starting from a position of the end-effector at the time the end-effector disengages (e.g., drops) the target object at the destination location and ending at the start location (e.g., at or proximate the source location). For example, calculating or updating the return path can include calculating or updating a hybrid 'shortcut' return path representing a combination of a destination depart path and a return path. In such embodiments, the subblock 1092 can be omitted. As another example, calculating or updating the return path can include calculating or updating a return path such that the end-effector is (e.g., immediately) moved (e.g., horizontally) toward the start location after placing the target object at the destination location. In these and other embodiments, calculating or updating the return path can include calculating or updating a return path directly from a location at which the end-effector disengages the target object to the start location. Additionally, or alternatively, calculating or updating the return path and/or a corresponding return speed can include optimizing the return path and/or the return speed to minimize or reduce time spent by the robotic system moving the end-effector from the location of the end-effector at the time the end-effector disengages the target object to the start location.

As discussed above, the start location can be (i) a default location and/or (ii) a location at which to position the end-effector to implement (or as part of implementing) all or a subset of a next motion plan, such as for transferring a next target object between a source location and a destination location. In the event the start location is (e.g., at the time subblock 1088 is executed) a default location, calculating or updating the return path can include determining or updating a path by which to return the end-effector to the default location. Alternatively, calculating or updating the return path can include (i) updating the start location from the default location to another location different from the default location (e.g., a location that facilitates implementing all or a subset of the next motion plan), and/or (ii) determining or updating a path along which to move the end-effector to position the end-effector at the other location. In the event that the start location is (e.g., at the time subblock 1088 is executed) a location at which to position the end-effector to implement (or as part of implementing) the next motion plan, calculating or updating the return path can include determining or updating a path along which to move the end-effector to position the end-effector at the start location (e.g., such that the return path links into one or more paths derived for the next motion plan).

At block 1076, the method 1070 continues by implementing the second portion of the motion plan for transferring the target object to the destination location. Implementing the second portion of the motion plan can include moving the target object toward the destination location according to the destination approach path and/or the destination approach speed calculated and/or updated at subblock 1090. Implementing the second portion of the motion plan can include lowering (e.g., a portion, such as a bottom surface of) the target object to a release height. As shown in subblock 1093, implementing the second portion of the motion plan can include placing the target object at the destination location, such as by disengaging (e.g., dropping, releasing) the target object at the release height. Implementing the second portion of the motion plan can include raising the end-effector to the height and/or location specified by the destination depart path and/or in accordance with the destination depart speed. Implementing the second portion of the motion plan can include moving the end-effector to the start location from the height and/or location specified by the destination depart path and/or in accordance with the return path and/or return speed. Alternatively, implementing the second portion of the motion plan can include moving the end-effector to the start location in accordance with the hybrid 'shortcut' return path and/or an associated return speed. For example, implementing the second portion of the motion plan can include moving the end-effector to the start location along the hybrid 'shortcut' return path and from the location of the end-effector at the time the end-effector disengages the target object. In implementations in which the start location is initially (e.g., at the time subblock 1088 is executed) a first location or a default location and then is updated to a different location (e.g., at the time subblock 1092 is executed), implementing the second portion of the motion plan can include moving the end-effector to the different location as opposed to the first/default location and along the return path/hybrid return path. In these and other embodiments, implementing the second portion of the motion plan can include moving the end-effector to the start location to facilitate implementing or as part of implementing a next motion plan for a next target object.

Although the steps of the method 1070 are discussed and illustrated in a particular order, the method 1070 of FIG. 10 is not so limited. In other embodiments, the steps of the method 1070 can be performed in a different order. In these and other embodiments, any of the steps of the method 1070 can be performed before, during, and/or after any of the other steps of the method 1070. Moreover, a person of ordinary skill in the relevant art will recognize that the illustrated method 1070 can be altered and still remain within these and other embodiments of the present technology. For example, one or more of the blocks 1071-1076 and/or one or more of the subblocks 1081-1093 of the method 1070 illustrated in FIG. 10 can be omitted and/or repeated in some embodiments.

CONCLUSION

The above detailed descriptions of embodiments of the technology are not intended to be exhaustive or to limit the technology to the precise form disclosed above. Although specific embodiments of, and examples for, the technology are described above for illustrative purposes, various equivalent modifications are possible within the scope of the technology as those skilled in the relevant art will recognize. For example, although steps are presented in a given order above, alternative embodiments may perform steps in a different order. Furthermore, the various embodiments described herein may also be combined to provide further embodiments.

From the foregoing, it will be appreciated that specific embodiments of the technology have been described herein for purposes of illustration, but well-known structures and functions have not been shown or described in detail to avoid unnecessarily obscuring the description of the embodiments of the technology. To the extent any material incorporated herein by reference conflicts with the present disclosure, the present disclosure controls. Where context permits, singular or plural terms may also include the plural or singular term, respectively. In addition, unless the word "or" is expressly limited to mean only a single item exclusive from the other items in reference to a list of two or more items, then the use of "or" in such a list is to be interpreted as including (a) any single item in the list, (b) all of the items in the list, or (c) any combination of the items in the list. Furthermore, as used herein, the phrase "and/or" as in "A and/or B" refers to A alone, B alone, and both A and B. Additionally, the terms "comprising," "including," "having," and "with" are used throughout to mean including at least the recited feature(s) such that any greater number of the same features and/or additional types of other features are not precluded. Moreover, as used herein, the phrases "based on," "depends on," "as a result of," and "in response to" shall not be construed as a reference to a closed set of conditions. For example, an exemplary step that is described as "based on condition A" may be based on both condition A and condition B without departing from the scope of the present disclosure. In other words, as used herein, the phrase "based on" shall be construed in the same manner as the phrase "based at least in part on" or the phrase "based at least partially on." Also, the terms "connect" and "couple" are used interchangeably herein and refer to both direct and indirect connections or couplings. For example, where the context permits, element A "connected" or "coupled" to element B can refer (i) to A directly "connected" or directly "coupled" to B and/or (ii) to A indirectly "connected" or indirectly "coupled" to B.

From the foregoing, it will also be appreciated that various modifications may be made without deviating from the disclosure or the technology. For example, one of ordinary skill in the art will understand that various components of the technology can be further divided into subcomponents, or that various components and functions of the technology may be combined and integrated. In addition, certain aspects of the technology described in the context of particular embodiments may also be combined or eliminated in other embodiments. Furthermore, although advantages associated with certain embodiments of the technology have been described in the context of those embodiments, other embodiments may also exhibit such advantages, and not all embodiments need necessarily exhibit such advantages to fall within the scope of the technology. Accordingly, the disclosure and associated technology can encompass other embodiments not expressly shown or described herein.

What is claimed is:

1. A method for operating a robotic system, the method comprising:

receiving sensor data representing a distance between (i) a sensor of the robotic system and (ii) a target object engaged by an end-effector of the robotic system;

determining a height of the target object based at least in part on the sensor data; and updating, based at least in part on the height of the target object, a motion plan for placing the target object at a destination location, wherein, before the update, the motion plan includes placing the target object at a measurement location that corresponds to an estimated height of the target object, the measurement location initially corresponding to a termination of the motion plan and a starting point of a next motion plan, wherein the height of the target object is determined with the target object placed at the measurement location, wherein the updated motion plan includes commands, settings, or a combination thereof for operating a robotic arm and the end-effector to (i) further approach the destination location from the measurement location to a newly derived drop location and (ii) disengage the target object from the newly derived drop location for placing the target object at the destination location, wherein the newly derived drop location replaces the measurement location for the starting point of the next motion plan from the newly derived drop location.

2. The method of claim 1, wherein determining the height of the target object based at least in part on the sensor data includes:

determining a first distance between a location of the end-effector and the sensor;

determining, based at least in part on the sensor data, the distance between the sensor and the target object, wherein the distance between the sensor and the target object is a second distance; and determining a difference between the first distance and the second distance.

3. The method of claim 2, wherein determining the first distance includes determining or tracking the location of the end-effector.

4. The method of claim 1, wherein updating the motion plan includes determining a release height above the destination location the end-effector is to disengage the target object.

5. The method of claim 4, wherein determining the release height include determining the release height based at least in part on one or more properties of the target object.

6. The method of claim 5, wherein the one or more properties include a weight of the target object.

7. The method of claim 1, wherein updating the motion plan includes determining a speed at which the robotic arm and the end-effector are to move the target object toward the destination location.

8. The method of claim 1, wherein:
the method further comprises deriving the motion plan;
deriving the motion plan includes precalculating first commands, first settings, or a first combination thereof for operating the robotic arm and the end-effector based at least in part on a maximum possible height value for the target object and/or a minimum possible height value for the target object; and
updating the motion plan includes updating, based at least in part on the height of the target object, the first commands, the first settings, or the first combination thereof to second commands, second settings, or a second combination thereof.

9. The method of claim 8, wherein updating the motion plan includes updating the motion plan prior to the robotic system implementing the first commands, the first settings, or the first combination thereof.

10. The method of claim 8, wherein updating the motion plan includes updating the motion plan while the robotic system implements at least a subset of the first commands, the first settings, or the first combination thereof.

11. The method of claim 1, wherein:
the commands, the settings, or the combination thereof are first commands, first settings, or a first combination thereof; and
the updated motion plan further includes second commands, second settings, or a second combination thereof for operating the robotic arm or the end-effector to return the end-effector to a start location directly from a location at which the end-effector disengages the target object for placing the target object at the destination location.

12. The method of claim 11, wherein:
the method further comprises deriving the motion plan;
deriving the motion plan includes:
precalculating, based at least in part on a maximum possible height value for the target object and/or a minimum possible height value for the target object, third commands, third settings, or a third combination thereof for operating the robotic arm and the end-effector to raise the end-effector to a specified height after disengaging the target object for placing the target object at the destination location, and
precalculating fourth commands, fourth settings, or a fourth combination thereof for operating the robotic arm and the end-effector to return the end-effector to the start location after raising the end-effector to the specified height; and
updating the motion plan includes updating, based at least in part on the height of the target object, the third commands, the fourth commands, the third settings, and/or the fourth settings to the second commands, the second settings, or the second combination thereof.

13. The method of claim 1, wherein:
the sensor data is first sensor data; and
the method further comprises:
receiving, while the end-effector approaches the destination location in accordance with the commands, the settings, or the combination thereof, second sensor data representing a second distance between (i) the sensor and (ii) the target object; and
determining the second distance based at least in part on the second sensor data.

14. The method of claim 1, further comprising deriving the motion plan, wherein the motion plan includes second commands, second settings, or a second combination thereof for operating the robotic arm and the end-effector to position the target object within a field of view of the sensor such that (i) the target object is positioned above the sensor and (ii) the end-effector is positioned on a side of the target object opposite the sensor.

15. The method of claim 1, wherein the target object is an unregistered object having a height initially unknown to the robotic system prior to determining the height of the target object based at least in part on the sensor data.

16. A non-transitory, computer-readable medium having processor instructions stored thereon that, when executed by one or more processors of a robotic system that has an end-effector, cause the robotic system to perform a method, the method comprising implementing instructions for:
implementing a motion plan corresponding to operating the robotic system to transfer a target object that is gripped by the end-effector to a measurement location associated with a sensor, wherein the measurement location initially corresponds to a termination of the motion plan and a starting point of a next motion plan;
determining, based at least in part on sensor data representing a distance between the sensor and the target object engaged by an end-effector that is placed at the measurement location, a height of the target object; and
updating, based at least in part on the height of the target object, the motion plan for placing the target object at a destination location, the updated motion plan including commands, settings, or a combination thereof for operating a robotic arm and the end-effector to (i) further approach the destination location from the measurement location to a newly derived drop location, (ii) disengage the target object from the newly derived drop location for placing the target object at the destination location, wherein the newly derived drop location replaces the measurement location as the starting point of the next motion plan from the newly derived drop location.

17. A robotic system, comprising:
a robotic arm;
an end-effector attached to the robotic arm; and
a distance sensor having a vertically oriented field of view,
wherein the robotic system is configured to:
transfer, using the robotic arm and the end-effector, a target object between a source location and a destination location according to a motion plan,
wherein transferring the target object includes:
placing the target object at a measurement location that is located between the source location and the destination location to present, using the robotic arm and the end-effector, the target object within the vertically oriented field of view of the distance sensor before placement of the target object at the destination location, wherein the measurement location initially corresponds to a termination of the motion plan and a starting point of a next motion plan; and
further transferring, using the robotic arm and the end-effector, the target object from the measurement location to a newly derived drop location that replaces the measurement location as the termination of the motion plan and the starting point of the next motion plan.

18. The robotic system of claim 17, wherein the distance sensor is positioned at a location between the source location and the destination location.

19. The robotic system of claim 17, wherein:

the destination location is positioned at a top surface of rollers of a conveyor; and the distance sensor is positioned beneath the destination location and the rollers of the conveyor.

20. The robotic system of claim 19, wherein at least a portion of the vertically oriented field of view of the distance sensor is unobstructed by the rollers of the conveyor.

* * * * *